United States Patent [19]
Fujita et al.

[11] Patent Number: 5,712,965
[45] Date of Patent: Jan. 27, 1998

[54] THREE-DIMENSIONAL SOLID ARRANGING/EDITING METHOD IN A COMPUTER GRAPHIC SYSTEM AND SYSTEM

[75] Inventors: Takushi Fujita; Mitsuaki Fukuda; Chikako Matsumoto; Masaaki Oota; Hitoshi Matsumoto, all of Kawasaki; Shuro Shindo, Inagi; Waku Ooe, Inagi; Yuichi Nagai, Inagi, all of Japan

[73] Assignee: Fujitsu Limited, Kawasaki, Japan

[21] Appl. No.: 428,408

[22] Filed: Apr. 25, 1995

[30] Foreign Application Priority Data

| Apr. 25, 1994 | [JP] | Japan | 6-086781 |
| Apr. 25, 1994 | [JP] | Japan | 6-086782 |
| Apr. 24, 1995 | [JP] | Japan | 7-098701 |
| Apr. 24, 1995 | [JP] | Japan | 7-098766 |

[51] Int. Cl.$^6$ .................................................. G06F 15/00
[52] U.S. Cl. .................................................. 395/119
[58] Field of Search ................................. 395/155, 161, 395/119, 120, 121, 141, 133; 345/118

[56] References Cited

U.S. PATENT DOCUMENTS 5,461,709  10/1995  Brown ................................. 395/155

*Primary Examiner*—Phu K. Nguyen
*Attorney, Agent, or Firm*—Staas & Halsey

[57] ABSTRACT

A solid graphic arranging/editing method enables a user to enter or edit a solid graphic viewed on a display. According to the method, three points of a rectangular parallelepiped are specified, and the solid is arranged to be inscribed within the parallelepiped. A reference plane is then defined and a first point on the reference plane is specified. A local coordinate plane is also defined and a second point is specified on the local coordinate plane. A rectangle lying in the local coordinate plane and having the first and second points as diagonal vertices is then displayed. Auxiliary lines perpendicular to the local coordinate plane and passing the second point are also displayed and a third point on a selected auxiliary line is displayed. A rectangular parallelepiped is then displayed having the rectangle as one surface and the third point as a vertex. The position of the solid and the scales are then adjusted such that the solid is inscribed in the rectangular parellelepiped.

81 Claims, 22 Drawing Sheets

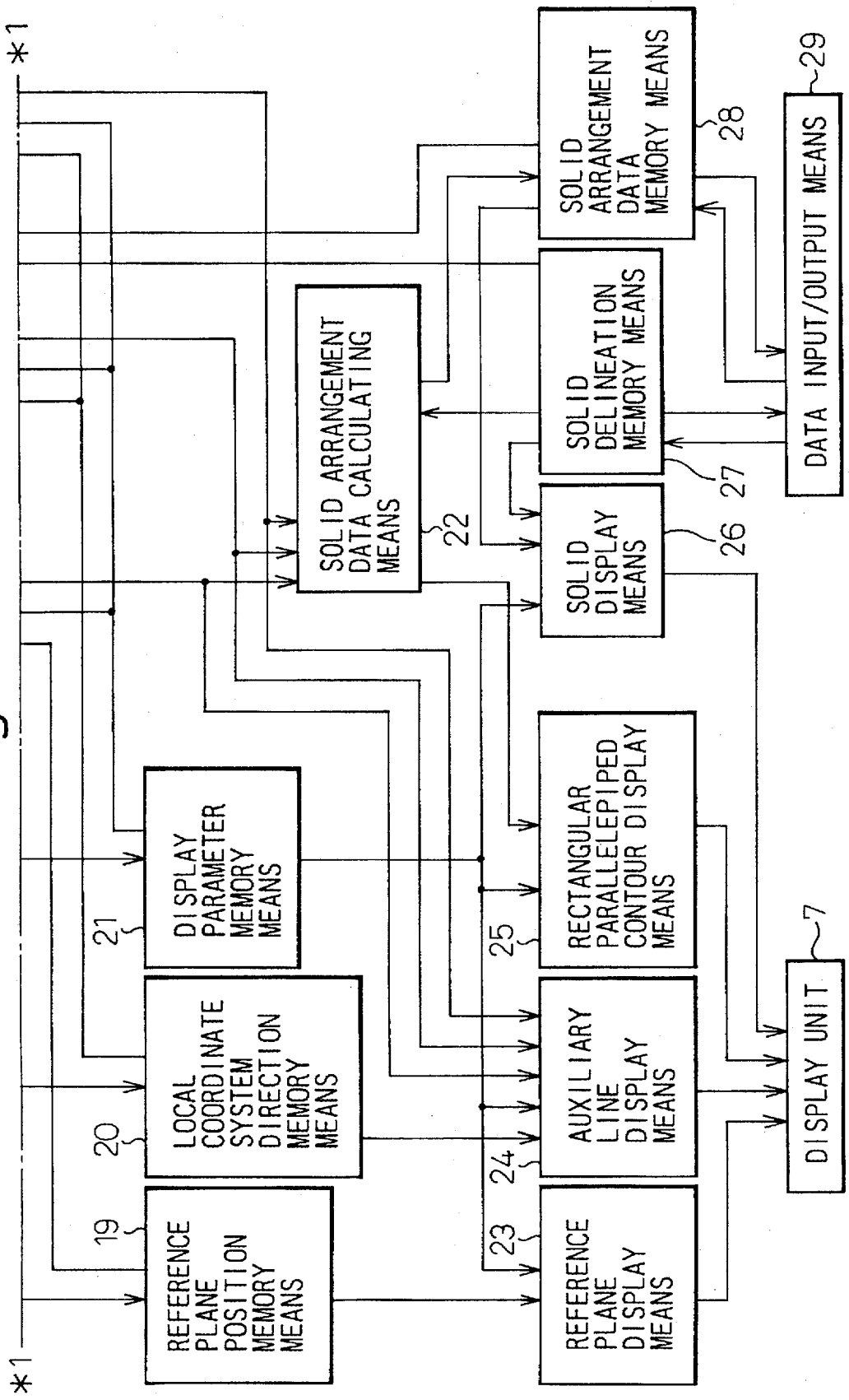

Fig.4

| NAME OF DATA | DESCRIPTION |
|---|---|
| SCREEN POINT POSITION DATA | • COORDINATES IN A SCREEN (SCREEN COORDINATE SYSTEM) |
| DISPLAY PARAMETERS | • COORDINATE TRANSFORMATION MATRIX (FROM A WORLD COORDINATE SYSTEM TO A POINT-OF-SIGHT COORDINATE SYSTEM)<br>• ANGLE OF A VISUAL FIELD |
| REFERENCE PLANE POSITION DATA | • COORDINATE TRANSFORMATION MATRIX (FROM A REFERENCE PLANE COORDINATE SYSTEM TO A WORLD COORDINATE SYSTEM) |
| LOCAL COORDINATE SYSTEM DIRECTION DATA | • COORDINATE TRANSFORMATION MATRIX (FROM A LOCAL COORDINATE SYSTEM TO A WORLD COORDINATE SYSTEM)<br>• HEIGHT DEFINITION AXIS |
| SOLID ARRANGEMENT DATA | • COORDINATE TRANSFORMATION MATRIX (FROM A LOCAL COORDINATE SYSTEM TO A WORLD COORDINATE SYSTEM)<br>• MAGNIFICATIONS (MAGNIFICATIONS FOR COORDINATE AXES X, Y, AND Z OF A LOCAL COORDINATE SYSTEM) |
| SOLID DELINEATION DATA | • MAXIMUX EXTERNAL DIMENSIONS (MINIMUM AND MAXIMUM X, Y, AND Z COORDINATES IN A SOLID DELINEATION COORDINATE SYSTEM)<br>• DELINEATION DATA |

BEFORE SETTING

AFTER SETTING

BEFORE SETTING

ROTATION BY DRAG

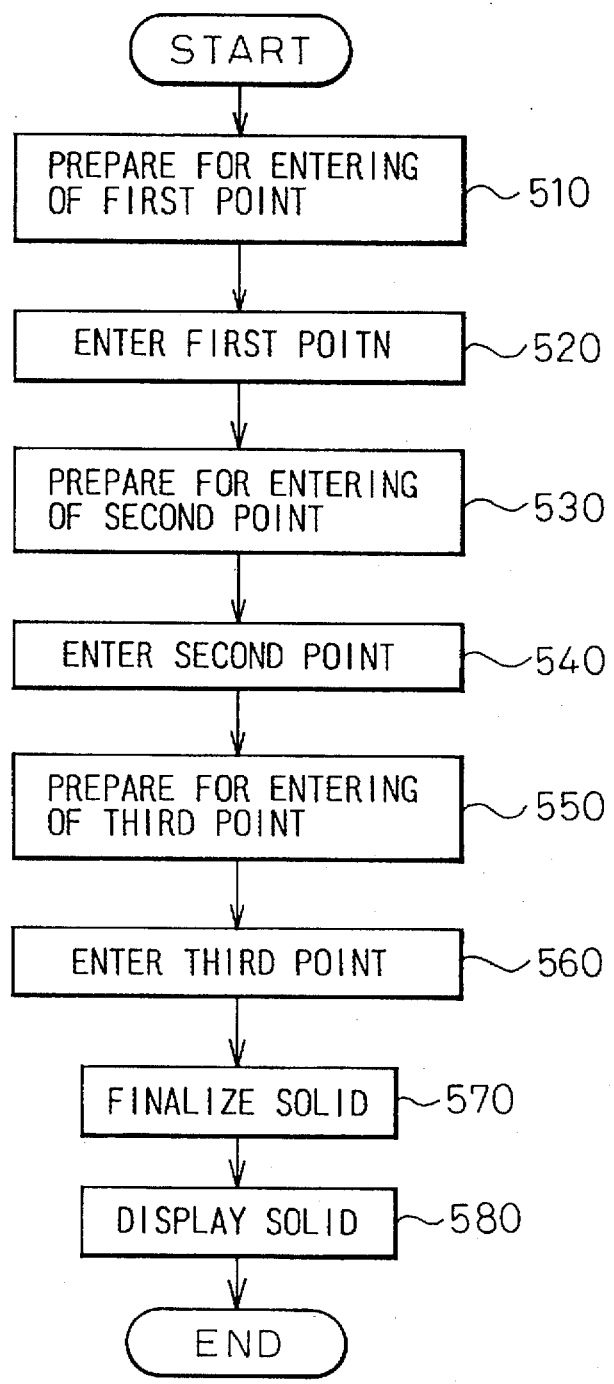

Fig.10A
BEFORE A FIRST POINT IS FINALIZED
A CANDIDATE OF THE FIRST POINT

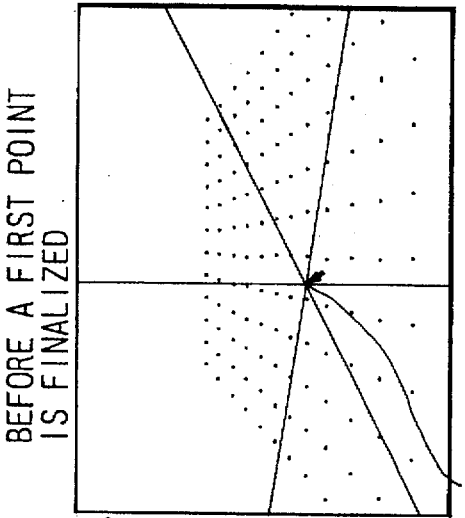

Fig.10B
AFTER A FIRST POINT IS FINALIZED
THE FIRST POINT
A CANDIDATE OF THE SECOND POINT

Fig.10C
AFTER A SECOND POINT IS FINALIZED
A CANDIDATE OF THE THIRD POINT
THE SECOND POINT

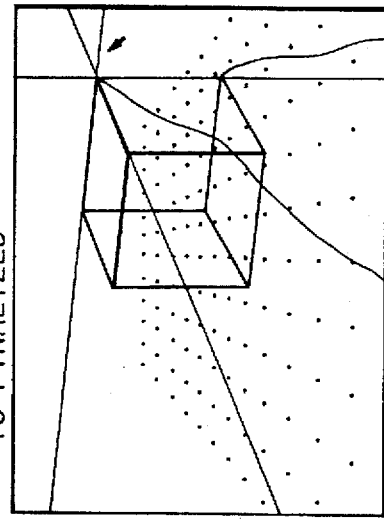

Fig.10D
AFTER A THIRD POINT IS FINALIZED
THE THIRD POINT
RECTANGULAR PARALLELEPIPED
FIXED SOLID
A CANDIDATE OF A FIRST POINT OF A TO BE ENTERED NEXT SOLID

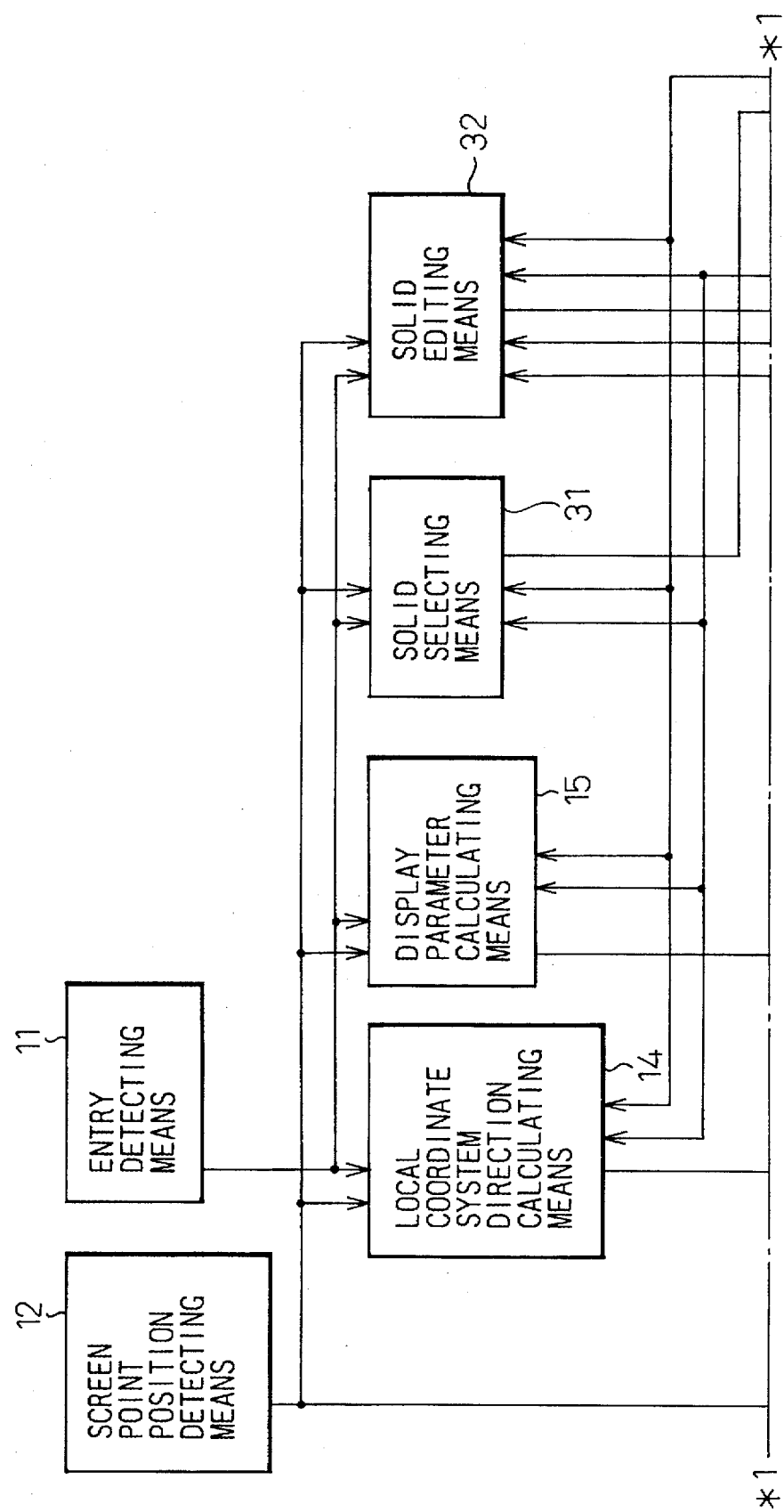

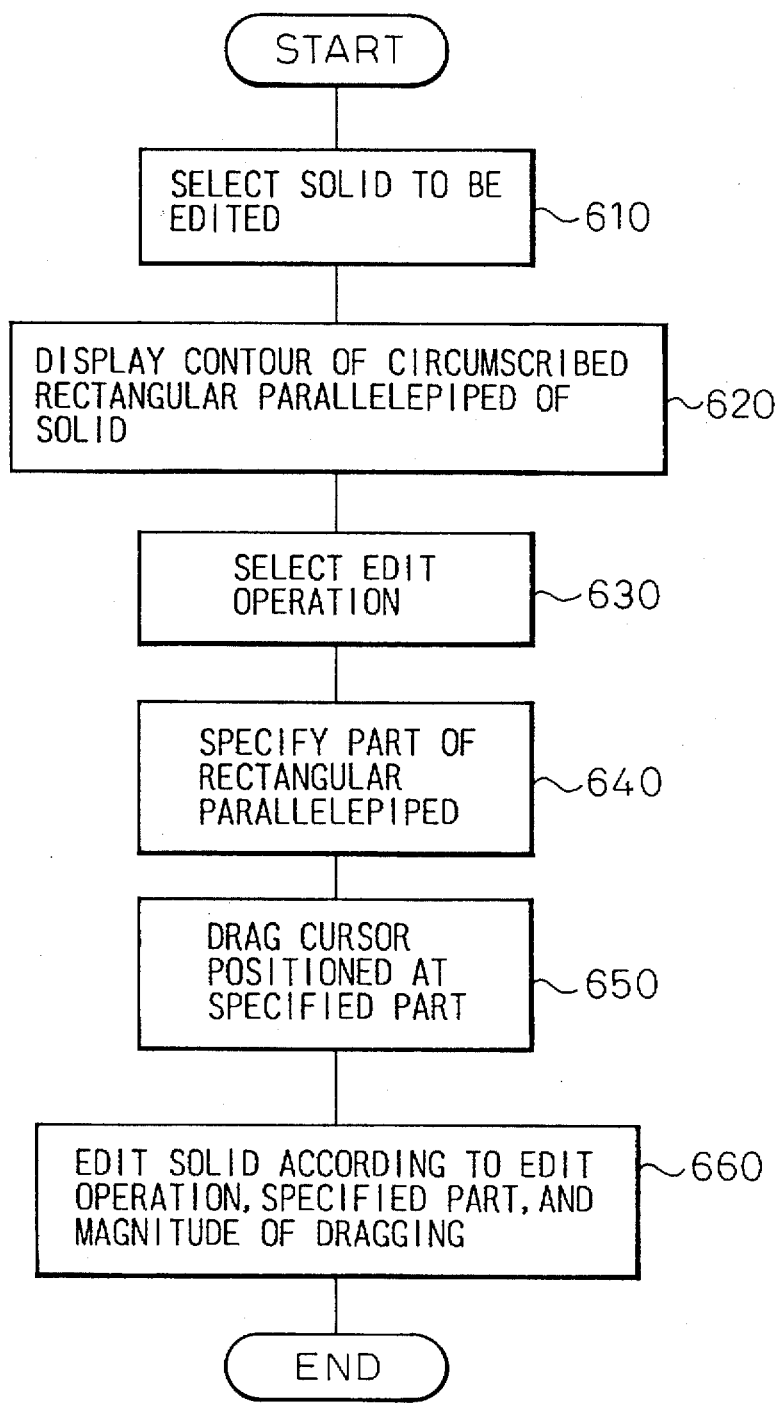

MOUSE CURSOR

MOUSE CURSOR

MOUSE CURSOR

MOUSE CURSOR

Fig.21A
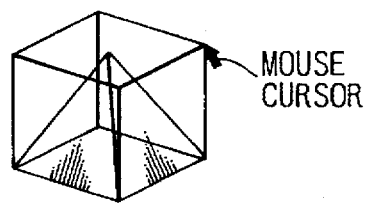
Fig.21B ↓
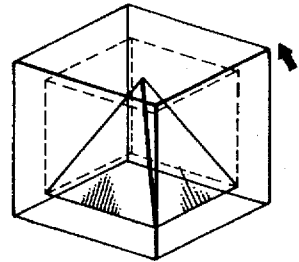
Fig.21C ↓
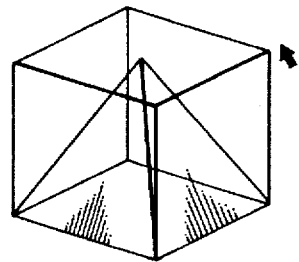
Fig.22A
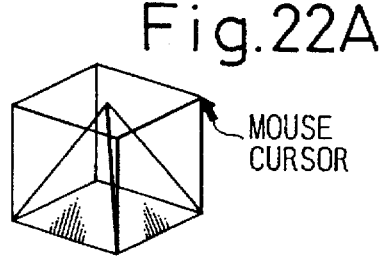
↓ Fig.22B
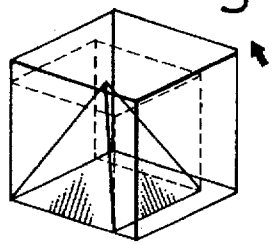
↓ Fig.22C
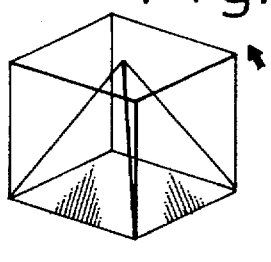

THREE-DIMENSIONAL SOLID ARRANGING/EDITING METHOD IN A COMPUTER GRAPHIC SYSTEM AND SYSTEM

BACKGROUND OF THE INVENTION

1. Field of the Invention

The present invention relates to a computer graphic system for arranging a solid graphic in a three-dimensional space and displaying the scene of arrangement on a two-dimensional screen. More particularly, this invention is concerned with a three-dimensional solid arranging/editing method and system for arranging a solid graphic in a three-dimensional space using a cursor whose position is defined by three coordinates or for translating or rotating the arranged solid graphic.

2. Description of the Related Art

In a computer graphic system capable of editing three-dimensional graphics, a user manipulates a mouse or the like so as to move or turn a cursor appearing in a screen, and thus specifies the position on the screen to enter a solid graphic or to perform editing such as to translate or rotate a displayed solid graphic. For entering a solid graphic, the conventional methods described below are available.

The first conventional method is the method, using three views, employed in computer aided design (CAD) (software) in which precise entry of positions is essential. Three views such as a front view, side view, and plan view are displayed simultaneously in a display screen. A three-dimensional position is specified using two of the three views by manipulating a mouse or the like. The size and orientation of a solid to be arranged are specified in each of the three views.

The first conventional method makes it necessary to specify a position in at least two of three views. This requires the work for selecting images serving as the views in which a position is specified and for checking the consistency among the positions specified in the images. This work is a burden to a user. Moreover, since three different images are displayed in the same screen, the display area for each image is limited. The images cannot be made very large.

Furthermore, each of three different images is produced by performing parallel projection. According to the parallel projection technique, when many solids are arranged in a three-dimensional space, the solids appear largely superposed on one another. The display screen is therefore hard to understand.

According to the second conventional method, a perspective view of a solid or a space containing the solid is two-dimensionally displayed in a screen, and a user specifies a three-dimensional position through the screen. When the size and orientation of a solid to be arranged are predetermined, the arrangement alone should be achieved using the three-dimensionally rendered perspective view. However, when the size and orientation of a solid to be arranged must be modified, a solid is entered by specifying a position on the screen using a mouse or the like and designating a new size by dragging a cursor and by clicking the mouse. Thereafter, the orientation or size of the solid, or the enlargement ratio along any of three axes of the solid is changed by manipulating the mouse.

In the second conventional method, a three-dimensional position cannot be specified merely by pointing to a position in a two-dimensional screen using a mouse or the like. Specifically, the x, y, and z axes must be displayed. Coordinates of a position along the three axes are then entered. The work is complex. Furthermore, for arranging a solid in a desired fashion, after the solid is temporarily arranged in a three-dimensional space, changes must be made to the solid. In short, it is impossible to arrange a solid in a desired fashion in one working procedure.

For editing a solid, that is, for translating or rotating a solid arranged in a three-dimensional space or for enlarging or reducing a solid in one direction or all directions, a user must move a cursor on a screen by manipulating a mouse or another pointing device and clicking on a point specified by the cursor.

According to the first conventional method for translating a displayed solid, three kinds of views of a solid such as a front view, side view, and plan view are displayed, the views are translated in parallel with the respective view screens. The translations made in the respective views are synthesized, thus translating the solid three-dimensionally.

However, since at least two of three views must be processed in order to translate a solid in any direction in a three-dimensional space, the work is complex. Moreover, since a final three-dimensional translation is determined by synthesizing translations made in three views, it is hard to discern the direction or magnitude of translation intuitively. Furthermore, the three view images are produced by parallel projection. According to the parallel projection technique, when many solids are arranged in a three-dimensional space, the solids appear largely superposed on one another. The display screen is therefore hard to understand.

In the second conventional method for translating a displayed solid, the same three views as used in the first method are employed. A vector is entered in each of the views, and a solid concerned is selected and translated.

The second method poses a problem in that the direction of translation is hard to discern intuitively. The second method shares the same problems with the first method.

It is hard to translate a solid defined in a three-dimensional space when it is displayed in a two-dimensional screen, because a direction or magnitude of translation cannot be designated through the screen.

For enlarging or reducing a displayed solid, conventionally, a mouse or the like is used to specify a solid in a screen and then clicked to drag the cursor and translate the solid.

This method poses a problem in that the three axes determining the depth, width, or height of a solid cannot be enlarged or reduced independently.

According to the first conventional method for rotating a displayed solid, a solid is specified on a screen and freely rotated vertically or laterally on the screen by dragging a cursor.

This method poses a problem in that it is hard to rotate a solid about a specific axis and to enter an accurate magnitude of rotation.

According to the second conventional method of rotating a displayed solid, an axis or rotation is pre-set in each of three views, and a solid is rotated about the axis by dragging a cursor using a mouse.

This method poses such a problem that it is hard to specify an axis of rotation.

According to the third conventional method of rotating a displayed solid, individual solids are rotated about axes pre-set exclusively for them by dragging a cursor using a mouse.

This method poses such a problem that each solid can be merely rotated about one rotation axis but cannot be rotated in other fashions.

According to the fourth conventional method of rotating a displayed solid, a solid is rotated about a specific axis determined relative to a screen, for example, an axis perpendicular to a screen or a horizontal or vertical axis parallel to a screen.

This method poses such a problem that a solid in an oblique perspective view cannot be turned about an axis inherent to the solid.

As mentioned above, in the conventional solid graphic arranging/editing method or system to be implemented in a computer graphic system, it is hard to enter or edit a solid graphic while viewing a user-discernible display.

SUMMARY OF THE INVENTION

An object of the present invention is to realize a solid graphic arranging/editing method and a system which enables a user to simply enter or edit a solid graphic while viewing a user-discernible display.

To accomplish the above object, a graphic system to which the present invention applies allows a user to specify a position in a screen with a cursor. In a three-dimensional solid arranging/editing method in accordance with the first aspect of the present invention to be implemented in the graphic system, first, a user defines a reference plane in a three-dimensional space and enters a position of a point on the reference plane specified by a cursor, which is supposed to move on the defined reference plane, as a three-dimensional position of a point.

For defining a reference plane, a solid is selected using a cursor, any of predetermined rules for producing a reference plane is selected, and then the position of the point on the reference plane is computed according to the selected solid and the selected rule for producing a reference plane.

Under one rule for producing a reference plane, a selected solid is expressed in a local coordinate system, and a plane passing through a point on the selected solid specified by a cursor and parallel to a screen is regarded as the reference plane of the local coordinate system.

Under another rule for producing a reference plane, a selected solid is expressed in a local coordinate system, and a plane in contact with the selected solid is regarded as the reference plane of the local coordinate system.

Under yet another rule for producing a reference plane, a selected solid is expressed in a local coordinate system, and a plane passing the center of the selected solid is regarded as a reference plane of the local coordinate system.

In the three-dimensional solid arranging/editing method in accordance with the first aspect of the present invention, a user first defines a reference plane in a three-dimensional space and then selects a point on the reference plane using a cursor, which is supposed to move on the defined reference plane, as a three-dimensional position. After the reference plane is defined, a point in the three-dimensional space can be specified using the cursor. When a plurality of solids are arranged relative to a common reference plane, the number of entries of three-dimensional positions can be reduced drastically.

To define a reference plane in a three-dimensional plane, an appropriate solid is displayed and utilized. Since a solid is used to define a reference plane, the work of defining a reference plane is simplified. To change the orientation of a reference plane, a solid is rotated according to a conventionally employed procedure. In an initial state prior to definition of a reference plane, when an appropriate solid is specified, the solid appears in a given area of a screen.

Preferably, it can be selected whether or not to display a defined reference plane.

A defined reference plane is displayed so that a user can recognize the position. Once the position of the reference plane is recognized, when the reference plane is displayed, the display of a screen may become too complex. It is therefore made selective whether or not to display a reference plane, so that the display of a reference plane can be disabled in the foregoing case.

As for displaying a defined reference plane, a reference plane may be displayed, for example, in the form of an array of dots. This makes the reference plane easily distinguishable from other displayed solids.

In a three-dimensional solid arranging/editing method in accordance with the second aspect of the present invention, three given points of a rectangular parallelepiped are specified in a three-dimensional space and a solid is arranged so that it will be inscribed in the rectangular parallelepiped. In particular, the three-dimensional solid arranging/editing method based on the procedure of entering a position of a point on a reference plane comprises: a step of defining a reference plane in a three-dimensional space and entering a point on the reference plane specified by a cursor, which is supposed to move on the reference plane, as a first point; a step of defining a local coordinate system having the reference plane as one of coordinate planes; a step of displaying a point on the coordinate plane specified by the cursor, which is supposed to move on the coordinate plane of the local coordinate system, as a second point candidate; a step of displaying a rectangle lying on the coordinate plane of the local coordinate system and having the first point and second point candidate as given points; a step of entering a second point candidate as a second point; a step of displaying auxiliary lines extending perpendicularly to the coordinate plane of the local coordinate system and passing the second point and also displaying a point on any auxiliary line specified by the cursor as a third point candidate; a step of displaying a rectangular parallelepiped having the rectangle as one surface or section and the third point candidate as a vertex; a step of entering the third point candidate as a third point; and a step of arranging a solid whose delineation is predetermined by adjusting the position of the solid and the scales in three coordinate axial directions thereof so that it will be inscribed in the rectangular parallelepiped.

Various procedures are available for determining a rectangular parallelepiped. For example, first, second, and third points are used as vertices of a rectangular parallelepiped. Alternatively, a first point is used as a center point of a rectangular parallelepiped, a second point is used as a middle point of one side thereof, and a third point is used as a vertex thereof. Otherwise, a first point is used as a center point of a base of a rectangular parallelepiped, a second point is used as a vertex of the base thereof, and a third point is used as a vertex of a plane opposed to the base thereof.

After a local coordinate system is determined, it is preferred that three straight lines crossing at a point specified by a cursor can be displayed in parallel with three coordinate axes defining the local coordinate system.

Preferably, one of the three straight lines displayed is recognized as a height definition axis and displayed with a different color from the other two lines.

In the three-dimensional solid arranging/editing method in accordance with the second aspect of the present invention, a first point is entered using a defined reference plane, a local coordinate system is determined, second and third points are entered, and a solid is arranged so that it will be inscribed in a rectangular parallelepiped having a rectangle, of which diagonal vertices are the first and second points, as one surface and having the third point as one vertex. Consequently, the work of entering a point is reduced. The magnifications in different directions can be set to different values.

After a local coordinate system is determined, three straight lines crossing at a point specified by a cursor are displayed in parallel with the three coordinates axes of the local coordinate system. Second and third points can therefore be entered easily.

In a three-dimensional solid arranging/editing method in accordance with the third aspect of the present invention, a ratio among the external dimensions in three coordinate axial directions of a solid whose delineation is predefined is determined and a rectangular parallelepiped inscribing the solid is determined. A reference plane is then defined in a three-dimensional space. A point on the reference plane, as specified by a cursor which is supposed to move on the reference plane, is entered as a first point. A local coordinate system having the reference plane as one coordinate plane is determined. A point on the coordinate plane specified by the cursor, which is supposed to move on the coordinate plane of the local coordinate system, is displayed as a second point candidate. A rectangle lying on the coordinate plane and having the first point and second point candidates as given points is displayed. A second point candidate is entered as a second point. The solid is arranged so that one surface of the rectangular parallelepiped inscribing the solid will coincide with the rectangle.

Various procedures are available for determining a rectangular parallelepiped.

In the three-dimensional solid arranging/editing method in accordance with the third aspect of the present invention, the ratios between the external dimensions in three coordinate axial directions of a solid which is to be entered and whose delineation is predefined as well as a rectangular parallelepiped inscribing the solid are predetermined. The rectangular parallelepiped inscribing the solid can be arranged merely by specifying first and second points.

In the three-dimensional solid arranging/editing method in accordance with the fourth aspect of the present invention, the delineation of a solid to be entered is expressed in a delineation coordinate system. A local coordinate system is defined in a three-dimensional space. The delineation of a solid expressed in the delineation coordinate system is transformed into data conformable to the local coordinate system. The solid is then arranged according to the resultant solid delineation data expressed in the local coordinate system.

In the three-dimensional solid arranging/editing method in accordance with the fourth aspect of the present invention, once a local coordinate system is defined, a solid to be entered can be arranged accordingly.

A step of defining a local coordinate system is achieved by selecting a solid already arranged in a space, and designating the local coordinate system for expressing the selected solid or designating the local coordinate system for expressing a solid produced by rotating the selected solid using a cursor. Since a solid already arranged in a space is selected, the work is simple.

In the three-dimensional solid arranging/editing method in accordance with the fifth aspect of the present invention, the contour of a circumscribed rectangular parallelepiped of a solid selected as an object to be edited is displayed, an edit operation is selected, and then a point on the contour is specified using an input means (a mouse or the like). Thus, editing is achieved. Depending on the selected edit operation and the selected point on the circumscribed rectangular parallelepiped, a fixed side or fixed point serving as a reference for editing is automatically determined.

When rotating a solid is selected as an edit operation, a point on a side of a circumscribed rectangular parallelepiped is specified and a cursor is dragged using an input means. Depending on a side specified, a rotation axis is determined. The solid is then rotated about the rotation axis according to the movement of the cursor.

When enlarging or reducing of a solid is selected as an edit operation, a point on a side of a circumscribed rectangular parallelepiped or a vertex thereof is specified and the cursor is dragged. Depending on a side or vertex specified, a fixed axis or fixed point is determined. When a fixed axis is determined, the solid is enlarged or reduced freely in two directions orthogonal to the axial direction. When a fixed point is determined, the solid is enlarged or reduced similarly with the fixed point as a center according to the movement of an input means.

When translating of a solid is selected as an edit operation, a side of a circumscribed rectangular parallelepiped or a solid itself is specified and a cursor is dragged using a screen point input means. As for directions of translation, planar directions of translation are predetermined.

According to the three-dimensional solid arranging/editing method in accordance with the fifth aspect of the present invention, when rotating or enlarging or reducing is to be carried out, a rotation axis, a direction and center of enlargement, or the like need not be designated. Depending on which part of a circumscribed rectangular parallelepiped is specified, a rotation axis, or a fixed point or fixed axis can be determined immediately during editing. This results in improved operability.

In the three-dimensional solid arranging/editing method in accordance with the sixth aspect of the present invention, directions in which a solid is translated are defined as planar directions of translation. After the planar directions of translation are designated, a cursor is dragged in order to translate the solid in the planar directions of translation. The designated planar directions of translation are represented by two orthogonal straight lines (axes extending in planar directions of translation) defining a plane in a three-dimensional space and one straight line perpendicular to the two orthogonal straight lines. The two orthogonal straight lines are distinguished from the one straight line perpendicular to them by differentiating colors. The three straight lines intersect at one point. The intersection usually coincides with a point in a screen specified by a screen point input means.

According to the three-dimensional solid arranging/editing method in accordance with the sixth aspect of the present invention, any directions of translation can be designated in order to translate a solid irrespective of the display parameters (for example, a position of a point of sight, direction of scrutiny, and angle of a visual field). Since three axes are displayed, the axial directions can be discerned easily.

BRIEF DESCRIPTION OF THE DRAWINGS

FIGS. 3A and 3B are a block diagrams showing the facilities employed in the first embodiment;

FIG. 4 is an explanatory diagram concerning data employed in the first embodiment;

FIG. 9 is a flowchart describing object entering in the first embodiment;

FIGS. 10A to 10D show the work of arranging and entering a solid in the first embodiment;

FIGS. 14A and 14B are block diagrams showing the facilities of a system employed in the second embodiment;

FIG. 16 is a flowchart describing an editing procedure in the second embodiment;

FIGS. 21A to 21C and 22A to 22C are explanatory diagrams concerning similar enlarging or reducing in the second embodiment.

DESCRIPTION OF THE PREFERRED EMBODIMENTS

Figure 1:
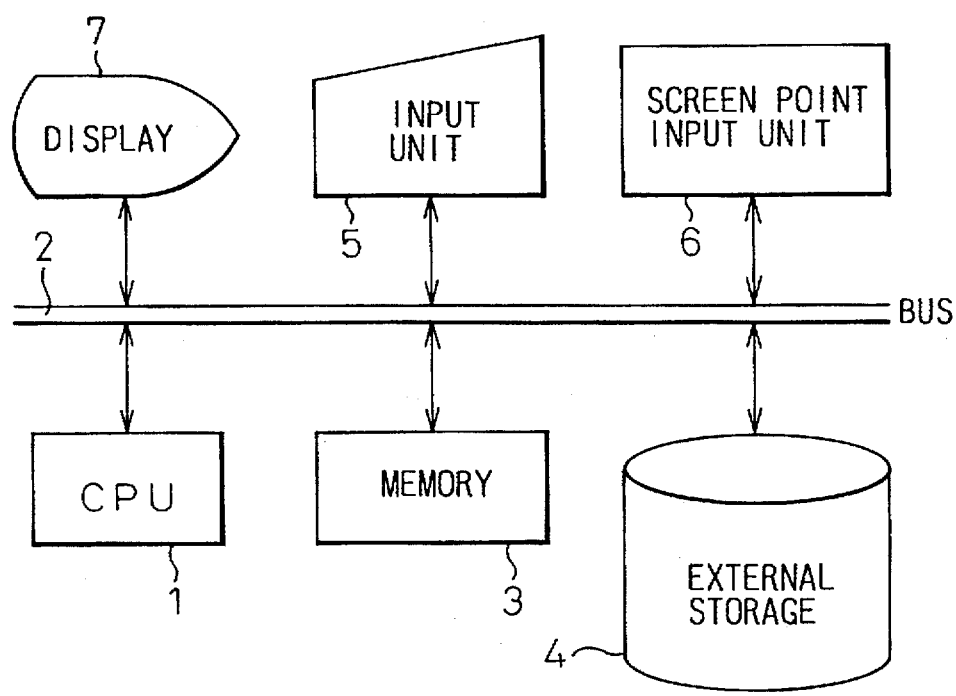
FIG. 1 shows the system configuration of an embodiment of the present invention.

FIG. 1 is a block diagram showing the configuration of a computer graphic system to which the present invention applies. The computer graphic system in accordance with the present invention is realized with a computer system comprising a CPU 1, bus 2, memory 3, external storage 4, input unit 5, screen point input unit 6, and display unit 7, and with programs running on the computer system.

For implementing the present invention, the programs are placed in memory and the CPU runs any of the programs residing in memory. When the present invention is implemented in the computer graphic system, data is placed in memory. For storage, data is saved on the external storage.

The input unit may be a keyboard. The screen point input unit may be a mouse or tablet. The mouse or tablet is used to specify and enter a point in a screen. By moving the mouse or a pen on the tablet, a point (cursor) in a screen can be moved. By clicking a button on the mouse, the position data can be entered into the system.

Figure 2:
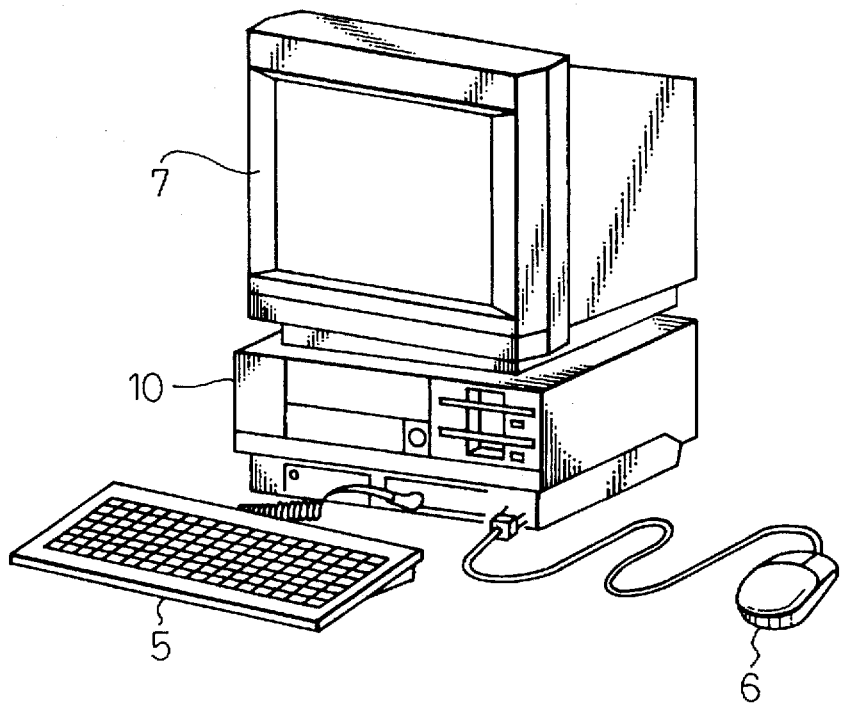
FIG. 2 shows the appearance of a system in accordance with the embodiment.

FIG. 2 shows the appearance of the computer system shown in FIG. 1. Reference numeral 10 denotes a computer in which the CPU 1, bus 2, memory 3, and external storage 4 are incorporated. A keyboard 5 is used as the input unit. A CRT display is used as the display unit. In this embodiment, a mouse 6 is used as the pointing input unit.

Figure 3A:
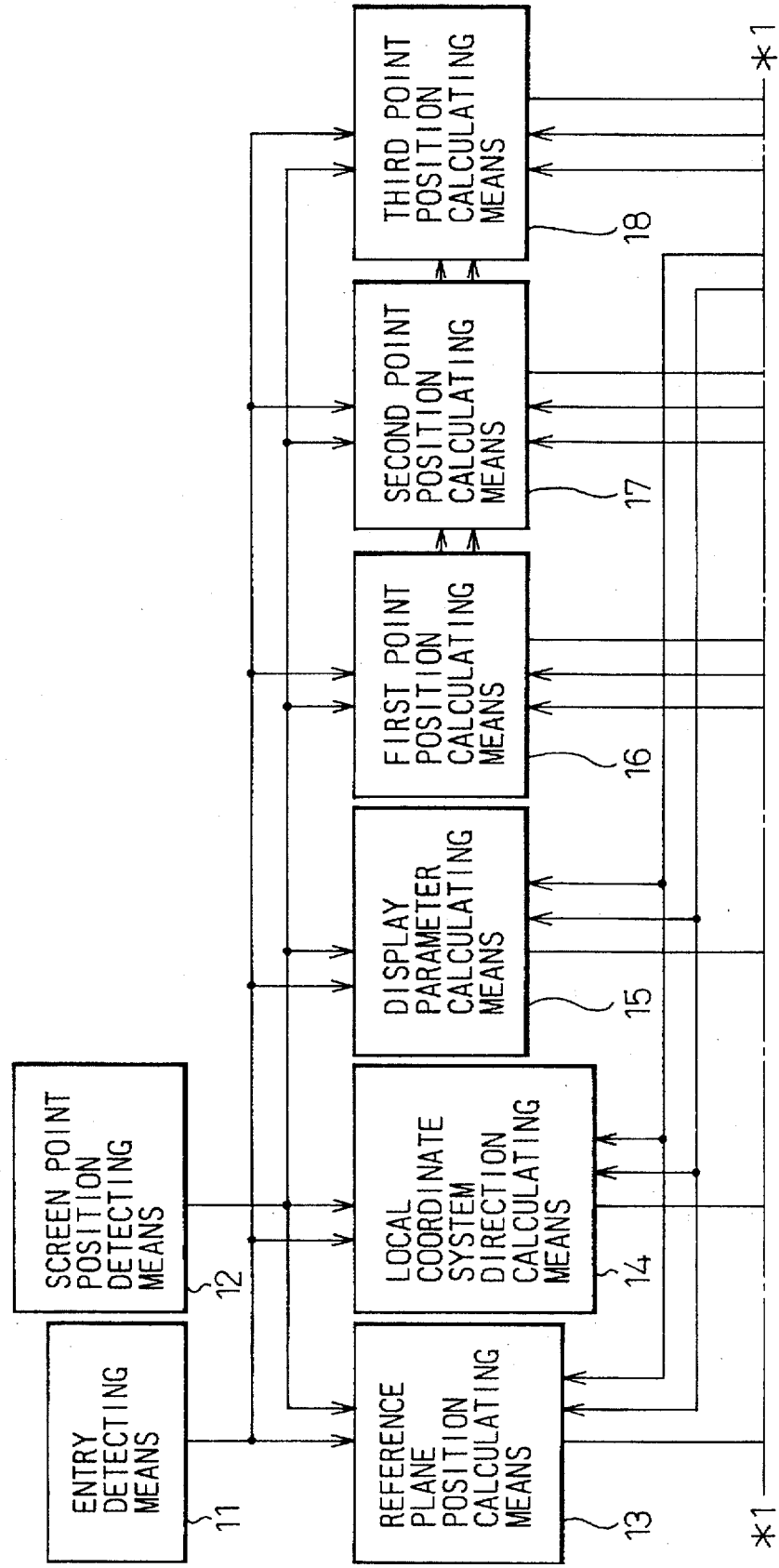

FIGS. 3A and 3B are block diagrams showing the facilities of a solid graphic arranging/editing system of the first embodiment of the present invention realized with the computer system shown in FIG. 1.

As shown in FIGS. 3A and 3B, a solid graphic arranging/editing system of this embodiment comprises an entry detecting means 11, a screen point position detecting means 12, a reference plane position calculating means 13, a local coordinate system direction calculating means 14, a display parameter calculating means 15, a first point position calculating means 16, a second point position calculating means 17, a third point position calculating means 18, a reference plane position memory means 19, a local coordinate system direction memory 20, a display parameter memory means 21, a solid arrangement data calculating means 22, a reference plane display means 23, an auxiliary line display means 24, a rectangular parallelepiped contour display means 25, a solid display means 26, a solid delineation memory means 27, a solid arrangement data memory means 28, a display means 7, and a data input/output means 29. The capabilities of these means will be described below.

The computer graphic system of this embodiment finalizes the arrangement of solids in a three-dimensional space and displays the solids.

To begin with, data representing a solid and employed in the computer graphic system of this embodiment will be described.

FIG. 4 is an explanatory diagram concerning data employed in this embodiment. As illustrated, the data includes screen point position data, display parameters, reference plane position data, local coordinate system direction data, solid arrangement data, and solid delineation data. The screen point position data represents a position of a point on a screen specified by a cursor and is provided as coordinates on the screen. The display parameters include a coordinate transformation matrix for use in transforming a world coordinate system into a point-of-sight coordinate system and an angle of a visual field. The reference plane position data represents a coordinate transformation matrix for use in transforming a reference plane coordinate system into a world coordinate system. The local coordinate system direction data includes a coordinate transformation matrix for use in transforming a local coordinate system into a world coordinate system and data representing a height definition axis. The solid arrangement data includes a coordinate transformation matrix for use in transforming a local coordinate system into a world coordinate system and magnifications in the directions of the x, y, and z axes of the local coordinate system involved in the transformation. The solid delineation data includes maximum external dimensions that are maximum and minimum x, y, and z coordinates in a solid delineation coordinate system as well as delineation data. Each of the screen point position data, the display parameters, the reference plane position data, and the local coordinate system direction data is needed by one data set. When a plurality of solids are arranged with a reference plane unchanged, the solid arrangement data stored in the solid arrangement data memory means 28 and the solid delineation data stored in the solid delineation memory means 27 are needed for the number of solids to be arranged.

A three-dimensional space is defined using a three-dimensional orthogonal coordinate system as a reference. The orthogonal coordinate system is referred to as a world coordinate system. In this embodiment, when a solid is expressed in the world coordinate system, a reference plane that will be described later is employed. A local coordinate system is defined relative to the reference plane.

The arrangement of a solid in the three-dimensional space is determined with the solid delineation data and solid arrangement data. The solid delineation data represents the delineation of a solid expressed in a coordinate system (solid delineation coordinate system) for use in expressing a solid. For example, when the solid is a polygon, the solid delineation data includes the coordinates of all the vertices of the polygon, a listing of vertices forming respective surfaces of the polygon, and other information necessary for defining the solid. The solid delineation data conformable to the solid delineation coordinate system is converted into data conformable to the local coordinate system prior to solid arrangement. The solid arrangement data describes the arrangement and size (scale) of a solid, of which delineation is defined in conformity with the local coordinate system, in terms of the world coordinate system. That is to say, the solid arrangement data includes a matrix for use in transforming a local coordinate system into a world coordinate system (in reality, the number of coordinate transformation matrices is not one, but a coordinate transformation matrix may be provided for each of rotation and scale conversion.

In general, a plurality of solids having different delineations are arranged in a space. Each of the solid arrangement data memory means 22 and solid delineation memory means 27 stores data concerning a plurality of solids. Data concerning each solid stored in the solid arrangement data memory means 22 is accompanied by information for use in identifying solid delineation data associated with the solid concerned.

Data stored in the solid delineation memory means 27 and solid arrangement data memory means 28 may be saved onto the external storage 4 by means of the data input/output means 29. Conversely, data stored in the external storage 4 can be read by means of the data input/output means 29.

Figure 5:
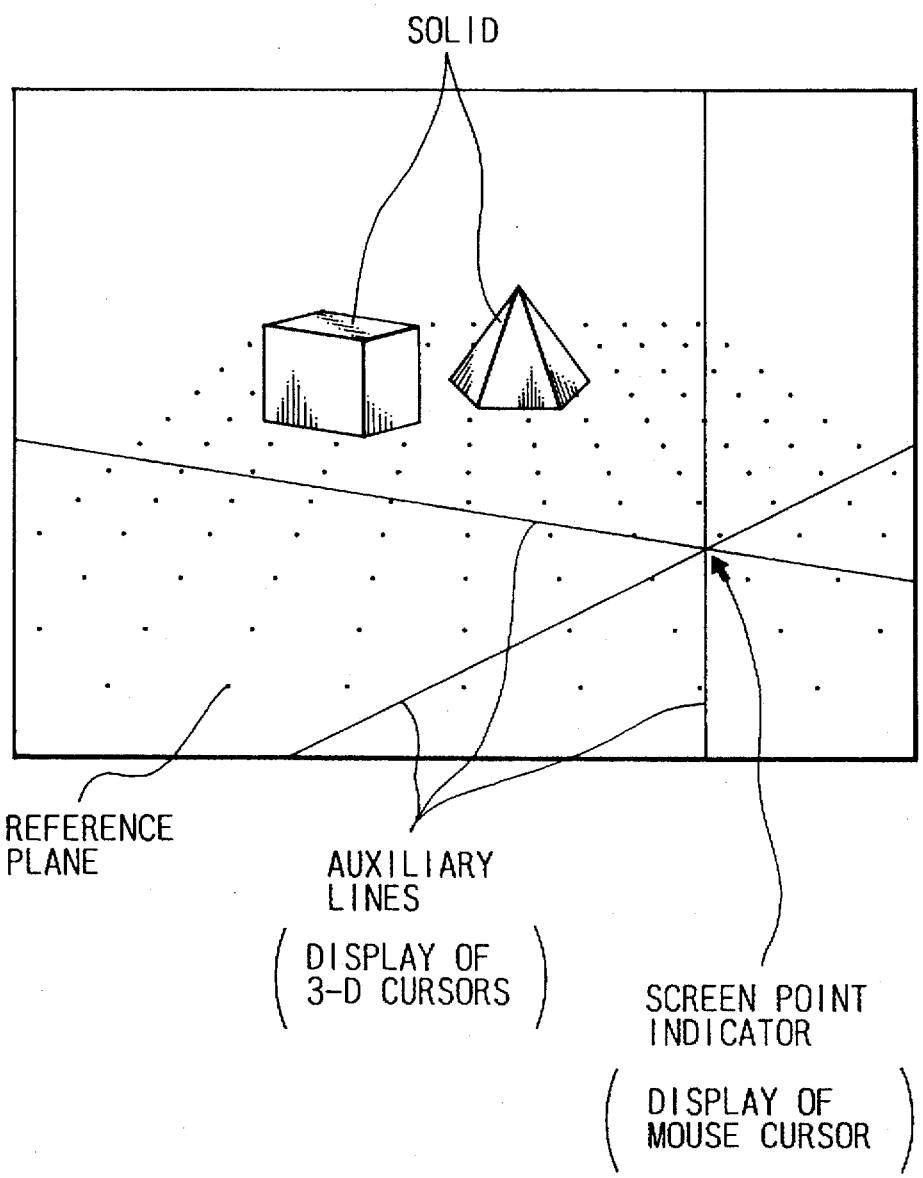
FIG. 5 shows an example of a display screen in the first embodiment.

Next, a screen display in this embodiment will be described. FIG. 5 shows an example of a display screen in this embodiment.

As shown in FIG. 5, according to this embodiment, a solid defined in the three-dimensional space, a reference plane that will be described later, a screen point indicator (cursor driven by a mouse), and auxiliary lines (three-dimensional cursors) that will be described later are displayed in a screen of the display unit 7. The movements of the cursor and auxiliary lines are controlled by the movement of the mouse. The display screen is used to perform coordinate transformation on each of the above data defined in conformity to the three-dimensional world coordinate system, to obtain coordinates in a two-dimensional screen, and to display a resultant solid. Display parameters restrain this transformation. According to the present invention, the display parameters are predetermined using the display parameter calculating means 15 and then stored in the display parameter memory means 21. This is intended to facilitate entering and image display.

The display parameters include information representing a position of a view point in the three-dimensional space, a direction of scrutiny, an inclination (roll angle), and an angle of a visual field. In practice, the position of a point of sight, direction of scrutiny, and inclination are defined as a whole in the form of a four-by-four matrix. This matrix serves as a coordinate transformation matrix for use in transforming a world coordinate system into a point-of-sight coordinate system (corresponding to a three-dimensional orthogonal coordinate system defined by an x axis in a horizontal direction of a screen, a y axis in a vertical direction thereof, and a z axis in a direction of a point of scrutiny with respect to a point of sight serving as an origin). An angle of a visual field is an angle of a visual field with respect to a lateral direction of a screen.

When a user uses the input unit or screen point input unit to modify display parameters, the display parameter calculating means 15 detects the modified parameters via the entry detecting means 11 or screen point position detecting means 12, calculates new values of display parameters by running a program, and then sets or modifies the display parameters.

Next, the setting of a reference plane will be described.

The position of a reference plane is pre-set as a reference for delineating, and stored in the reference plane position memory means 19. The position of a reference plane is defined in the form of a four-by-four matrix. The matrix serves as a coordinate transformation matrix for use in transforming an orthogonal coordinate system (reference plane coordinate system), in which plane xy serves as a reference plane into the world coordinate system.

When a user uses the input unit 5 or screen point input unit 6 to set a reference plane, the setting is detected by the entry detecting means 11 and screen point position detecting means 12. Depending on the contents of the setting, the reference plane calculating means 13 computes the position of the reference plane. The position is then stored in the reference plane position memory means 19.

The reference plane calculating means 13 computes reference plane data using the information provided by the entry detecting means 11 and screen point position detecting means 12 and the data stored in the solid arrangement data memory means 28 and solid delineation memory means 27. For setting a reference plane, a plurality of procedures are predetermined. A user selects any of the procedures. In one procedure of setting a reference plane, a given solid such as a cube is displayed according to user's specification. A user specifies part of the cube using a cursor and drags the cursor to change the orientation of the cube. The user drags the cursor so that one surface of the cube will serve as a reference plane, and then make an indication that the surface is determined as a reference plane.

FIGS. 6A to 6K show examples of reference plane setting which are associated with work carried out through a screen.

Figure 6E:
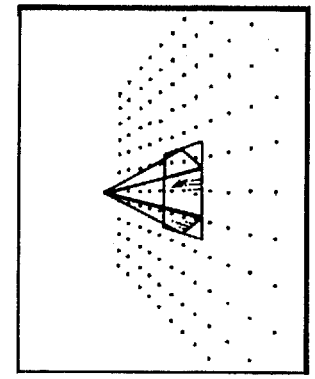
FIGS. 6A to 6K show a technique of setting a reference plane in the first embodiment.
Figure 6B:
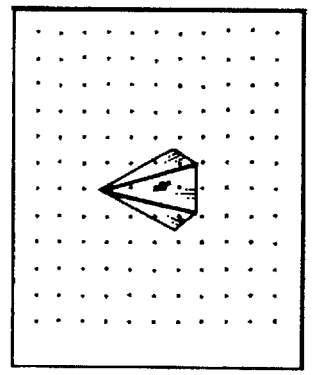
Figure 6D:
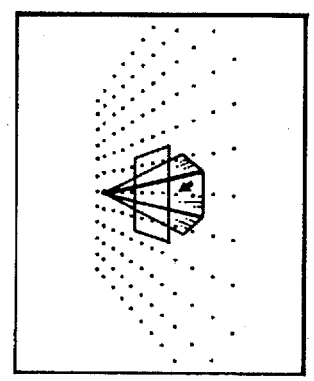
Figure 6A:
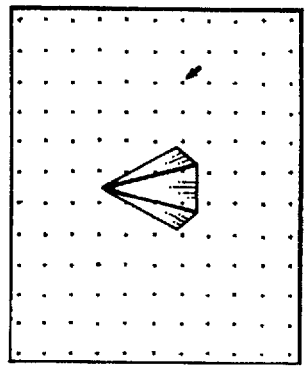

FIG. 6A shows an initial state of reference plane setting. When a user selects a solid and displays it in a screen, reference plane setting is initiated.

In FIG. 6B, a reference plane parallel to the screen is set. A cursor is positioned at the solid, and reference plane setting is designated (by clicking a button on a mouse). The reference plane calculating means 13 then computes three-dimensional coordinates identifying the position of the point on a surface of the solid specified by the cursor, and computes a reference plane coordinate system having a plane xy parallel to the screen with the point as an origin. A coordinate transformation matrix is then calculated.

Figure 6C:
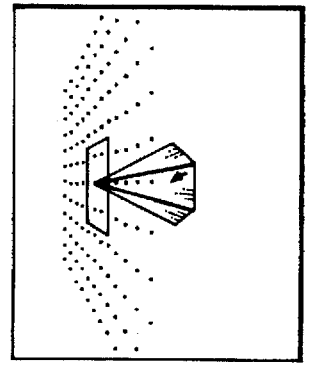

In FIGS. 6C to 6E, a reference plane is set in parallel to the coordinate plane xy of the local coordinate system in which a solid specified by a user is expressed. A cursor is positioned at the solid, and reference plane setting is designated (by clicking a button on a mouse). The reference plane calculating means 13 identifies the specified solid, computes a reference plane that is a plane xy parallel to the coordinate plane xy of the local coordinate system in which the solid is expressed and passing the center of the solid as shown in FIG. 6D or a plane xy in contact with the solid as shown in FIG. 6C or 6E, and then calculates a coordinate transformation matrix. FIG. 6C shows a reference plane that passes a point having a maximum z-coordinate in the local coordinate system in which the solid is expressed and that is parallel to the coordinate plane xy of the local coordinate system. FIG. 6E shows a reference plane that passes a point having a minimum z coordinate in the local coordinate system in which the solid is expressed and that is parallel to the coordinate plane xy of the local coordinate system.

Figure 6F:
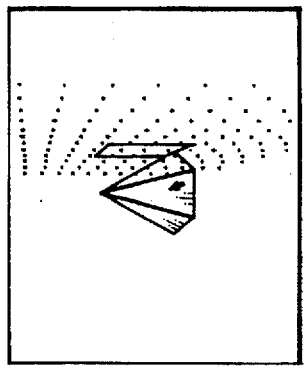
Figure 6G:
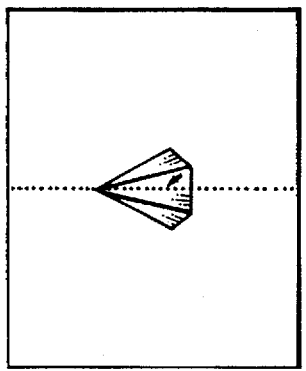
Figure 6H:
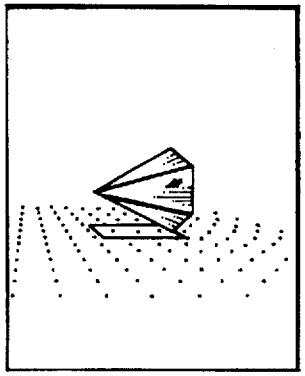
Figure 6I:
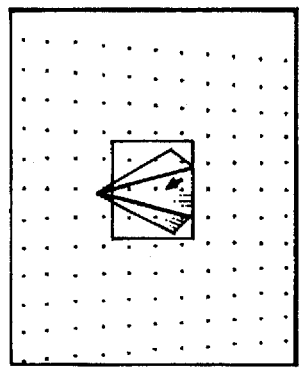
Figure 6J:
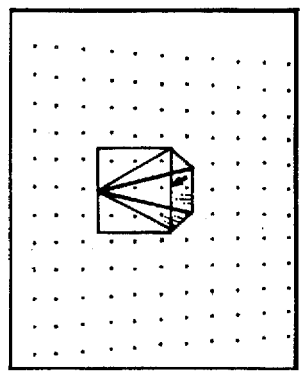
Figure 6K:
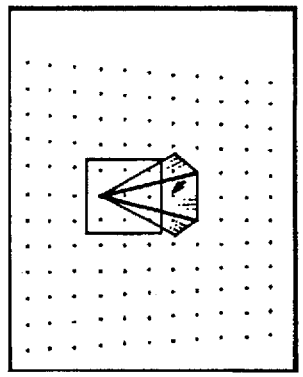

In FIGS. 6C to 6E, a reference plane is set in parallel to the coordinate plane xy of the local coordinate system. A reference plane may be set in parallel to the coordinate plane yz or zx of the local coordinate system. In FIGS. 6F to 6H, a reference plane is set in parallel to the coordinate plane yz of the local coordinate system. In FIGS. 6I to 6K, a reference plane is set in parallel to the coordinate plane zx of the local coordinate system.

When entering is performed (a button on a mouse is clicked) consecutively for the same solid, the foregoing various kinds of reference planes are set for the solid.

A reference plane set as mentioned above can be displayed as auxiliary information, which facilitates a user's work, in a screen. For example, as shown in FIGS. 6A to 6K, a reference plane is displayed in the form of dot arrays with a discernible position and orientation. Computer actions include defining of a square lattice on a reference plane and plotting of the intersections of the lattice in a screen. When a user recognizes the position and orientation of the reference plane, if he/she finds the screen display indiscernible because of the intersections of the lattice, the display of the reference plane may be disabled.

Next, setting of a local coordinate system will be described.

In preparation for delineating, a local coordinate system in which a solid to be entered is expressed is set and stored in the local coordinate system direction memory 20.

The directions of a local coordinate system are represented by vectors whose magnitudes and directions are provided as lengths and orientations of three axes (x, y, and z axes) of the local coordinate system in a world coordinate system. The vectors are defined in the form of a three-by-three matrix. Information representing a height definition axis is appended.

FIGS. 7A and 7B, and 8A and 8B show examples of setting the directions of a local coordinate system.

Figure 7A:
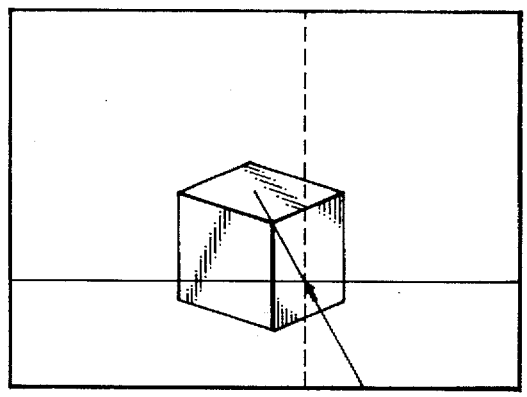
FIGS. 7A and 7B show a technique of setting coordinate axes defining a local coordinate system in the first embodiment.
Figure 7B:
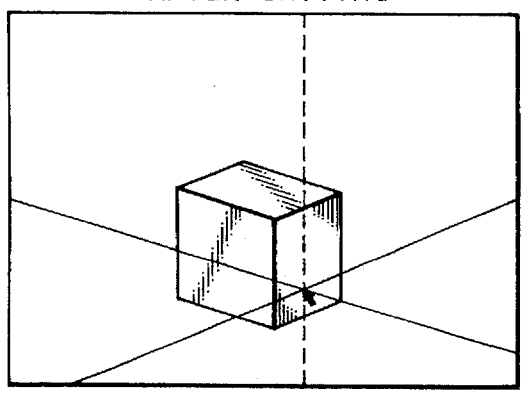

FIGS. 7A and 7B show a procedure of matching the directions of a local coordinate system with a solid appearing in a screen. A cursor interlocked with a mouse is positioned at the solid, and then a button on the mouse is clicked. The local coordinate system direction calculating means 14 identifies the solid specified, recognizes the directions of the location coordinate system in which the solid is expressed as new directions of a local coordinate system, and stores the new directions of a local coordinate system in the local coordinate system direction memory 20.

Figure 8A:
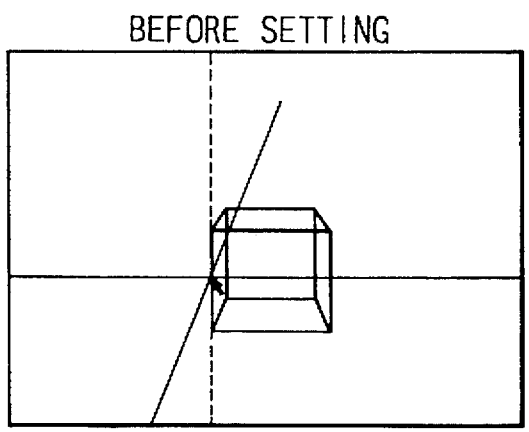
FIGS. 8A and 8B show another technique of setting coordinate axes defining a local coordinate system in the first embodiment.
Figure 8B:
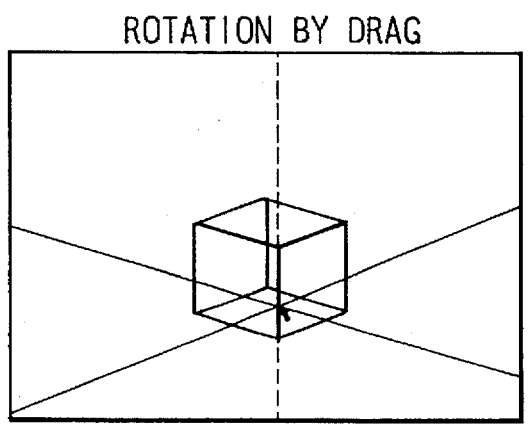

FIGS. 8A and 8B show a procedure of correcting the directions of a local coordinate system already stored in the local coordinate system direction memory means 20. First, a frame of a cube having sides parallel to the axes of the current local coordinate system is displayed in a screen. A cursor interlocked with a mouse is positioned on any of the sides and dragged with a button on the mouse held down. While the mouse is moved, the local coordinate system direction calculating means 14 calculates an angle of rotation according to the direction or magnitude of movement of the mouse, and rotates the cube about an axis that is a straight line parallel to the side on which the cursor is positioned and passing through the center of the cube. When the button on the mouse is released, the lines parallel to the sides of the cube are recognized as the axes of a new local coordinate system. Thus, the directions of a local coordinate system are determined.

The fundamental functions available in the computer graphic system of this embodiment have been described. Next, a procedure for entering a solid after a reference plane and directions of a local coordinate system are determined using the aforesaid functions will be described.

In this embodiment, a solid is entered by specifying three given points of a rectangular parallelepiped in a screen. Based on the three entered points, a rectangular parallelepiped having sides parallel to the axes of a local coordinate system is defined. The delineation of the solid is modified so that the solid will be inscribed in the rectangular parallelepiped. The solid is thus arranged in a three-dimensional space, and displayed in a screen. The details will be described below.

FIG. 9 is a flowchart describing the entry of a solid. FIGS. 10A to 10D show the transition of a display screen with the progress of an entering solid.

At step 510, preparations are made for entering a first point. In preparation for entering a first point for the purpose of arranging a solid and designating dimensions, a first point position calculating function, of which input is coordinates identifying the position of a point specified by a screen point indicator and of which output is three-dimensional coordinates identifying a first point candidate, is calculated. The result of calculation is placed in the first point position calculating means 16.

The function requires coordinates identifying a point in a screen as an input and three-dimensional coordinates identifying a point which satisfies the condition that it should coincide with a point specified by a screen point indicator and contained on a reference plane. The function is calculated by assigning reference plane position data and display parameters. The details of a sequence of calculating the function are described in a program.

When a point specified by the screen point indicator is translated with the movement of a mouse or the like, the first point position calculating means 16 uses the predetermined first point position calculating function to obtain three-dimensional coordinates and regards a point specified with the coordinates as a first point candidate.

At this time, the auxiliary line display means 24 analyzes the contents of the local coordinate system direction memory means 20 and the coordinates of the first point candidate, and computes data for use in displaying three straight lines, which are parallel to the coordinate axes represented by local coordinate system direction data and passing the first point candidate, on a two-dimensional screen. FIG. 10A shows resultant auxiliary lines passing the first point candidate.

At step 520 in FIG. 9, the first point candidate is entered as a first point according to user's specification. In reality, after the mouse is moved properly, the position of a point specified by the screen point indicator is computed. Point finalization is then carried out by pressing the button on the mouse. The first point candidate is then finalized as the first point.

At step 530 in FIG. 9, preparations for entering a second point are made.

After the first point is finalized, in preparation for entering a second point, a second point calculating function whose input is coordinates identifying the position of a point specified by the screen point indicator and whose output is three-dimensional coordinates identifying a second point candidate is calculated. The result of calculation is stored in the second point position calculating means.

The function requires coordinates identifying the position of a point specified by the screen point indicator as an input and provides three-dimensional coordinates identifying a point being perpendicular to a height definition axis and lying on a plane containing the first point as an output. The function is calculated by assigning local coordinate system direction data, display parameters, and the three-dimensional coordinates to the first point. Unlike a first point candidate provided by the first point position calculating function, a second point candidate provided by the second point position calculating function does not always coincide with the point specified by the screen point indicator (a point specified by a cursor interlocked with a mouse). However, the function is established so that the direction of movement of the screen point indicator will substantially be consistent with the direction of translation of a second point candidate in a screen. The details of a sequence for calculating the function are described in a program.

When the point specified by the screen point indicator is translated with the movement of the mouse or the like, the second point position calculating means 17 uses the predetermined second point position calculating function to obtain three-dimensional coordinates and regards a point specified with the coordinates as a second point candidate.

The auxiliary line display means 24 analyzes the contents of the local coordinate system direction memory means 20 and the coordinates of the second point candidate, and computes data for use in displaying three straight lines, which are parallel to coordinate axes represented by local coordinate system direction data and passing the second point candidate, in a two-dimensional screen. The solid arrangement data calculating means 22 computes a rectangle having the first point and second point candidate as diagonal vertices and having sides parallel to two section definition axes among the coordinate axes of the local coordinate system, and transfers the contour of the rectangle to the rectangular parallelepiped contour display means 25. With the data sent from the auxiliary line display means 24 and rectangular parallelepiped contour display means 25, the display unit 7 displays auxiliary lines passing the second point candidate and a rectangle having the first point and second point candidate as diagonal vertices and having sides parallel to the two section definition axes among the coordinate axes of the local coordinate system. FIG. 10B shows a resultant screen.

At step 540 in FIG. 9, the second point candidate displayed is entered as a second point according to user's specification. Practically, after the mouse is moved appropriately, the position of the point specified by the screen point indicator is computed. Point finalization is then carried out by pressing the button on the mouse. The second point candidate is then finalized as the second point.

At step 560 in FIG. 9, preparations for entering a third point are made.

After the second point is finalized, in preparation for entering a third point, a third point position calculating function whose input is coordinates identifying the position of a point specified by the screen point indicator and whose output is three-dimensional coordinates identifying a third point candidate is calculated. The result of calculation is stored in the third point position calculating means.

The function requires coordinates identifying the position of a point specified by the screen point indicator as an input and provides three-dimensional coordinates identifying a point on a straight line, which is parallel to the height definition axis and lies on a straight line containing the second point, as an output. The function is calculated by assigning local coordinate system direction data, display parameters, and three-dimensional coordinates of a second point. The third point candidate provided as the third point calculating function does not always coincide with the point specified by the screen point indicator (a point specified by the cursor interlocked with the mouse). The details of a sequence for calculating the function are described in a program.

When the point specified by the screen point indicator is translated with the movement of the mouse or the like, the third point position calculating means 18 uses the predetermined third point position calculating function to obtain three-dimensional coordinates and recognizes a point specified by the coordinates as a third point candidate.

The auxiliary line display means 24 analyzes the contents of the local coordinate system direction memory means 10 and the coordinates of the third point candidate, and computes data for use in displaying three straight lines, which are parallel to coordinate axes represented by local coordinate system direction data and passing the third point candidate, on a two-dimensional screen. The solid arrangement data calculating means 22 computes a rectangular parallelepiped having the first and second points, and the third point candidate as vertices and having sides parallel to three coordinate axes of the local coordinate system, and transfers the contour of the rectangular parallelepiped to the rectangular parallelepiped contour display means 25. With the data sent from the auxiliary line display means 25 and rectangular parallelepiped contour display means 25, the display unit 7 displays the auxiliary lines passing the third point candidate and the rectangular parallelepiped having the first and second points and the third point candidate as vertices and having the sides parallel to the three coordinate axes of the local coordinate system. FIG. 10C shows a resultant display screen.

At step 560 in FIG. 9, the third point candidate displayed is entered as a third point according to a user's specification. Practically, after the mouse is moved appropriately, the position of the point specified by the screen point indicator is computed. Point finalization is then carried out by pressing the button on the mouse. The third point candidate is then finalized as a third point.

Thus, a rectangular parallelepiped having the three points, which are finalized according to the procedure described above, as vertices and having sides parallel to the coordinate axes of the local coordinate system is defined uniquely.

At step 570, the solid arrangement data calculating means 22 computes information for use in arranging a solid represented by solid delineation data so that the solid will be inscribed in the rectangular parallelepiped; that is, solid arrangement data as described below.

First, ratios of maximum lengths of axes of a solid represented by solid delineation data to maximum lengths of the axes of the rectangular parallelepiped are calculated. The ratios are regarded as enlargement coefficients for the respective axes. The delineation of the solid is then enlarged (or reduced when the coefficients are smaller than 1.0) according to the enlargement coefficients, so that it will be inscribed in the rectangular parallelepiped.

A coordinate transformation matrix, which defines the rotation or translation to be made for arranging a solid so that the solid will be inscribed in the rectangular parallelepiped expressed in a world coordinate system, is calculated by assigning the coordinates of the three points and the local coordinate system direction data.

As mentioned above, a solid defined by the delineation is arranged in the local coordinate system. The components of the axes of the solid are multiplied by the enlargement coefficients. The resultant values are assigned to the coordinate transformation matrix, whereby a solid inscribed, as shown in FIG. 10D, in the rectangular parallelepiped expressed in the world coordinate system is produced.

The enlargement coefficients and coordinate transformation matrix are stored as solid arrangement data in the solid arrangement data memory means 29.

After the work for entering one solid is completed, at step 580, the solid display means 26 uses the contents of the solid arrangement data memory means 28 and delineation arrangement data memory means 27 to produce a perspective view containing all solids arranged in the three-dimensional space. The display unit 7 then displays the perspective view.

Figure 11:
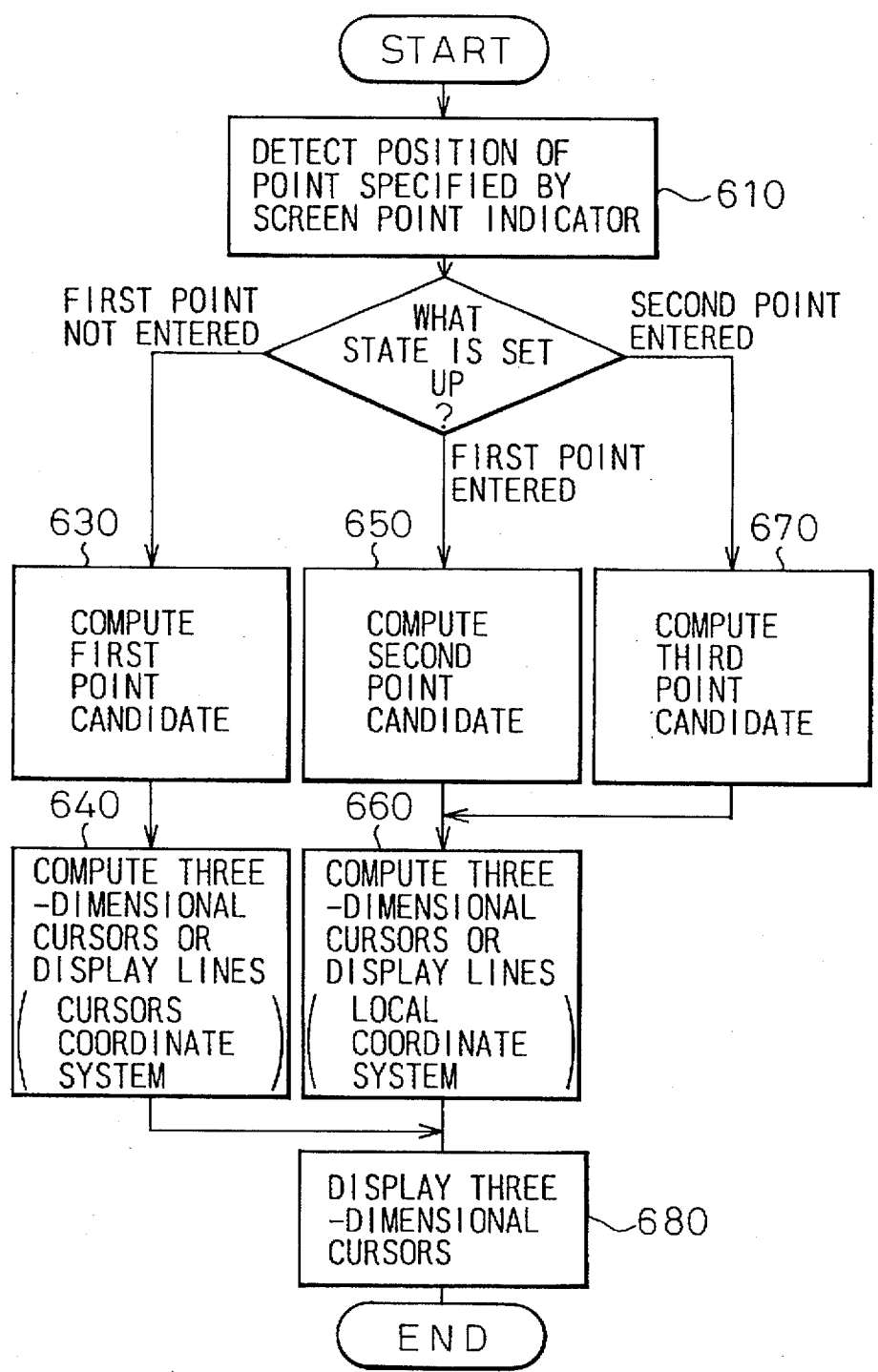
FIG. 11 is a flowchart describing a procedure of displaying a cursor in the first embodiment.

FIG. 11 is a flowchart describing a sequence of displaying a cursor with the progress of entering a solid.

The screen point position detecting means 12 detects that a specification is made at step 610, and then determines at step 620 what state is set up at that time; that is, determines whether a first point is about to be entered, the entry of a first point is completed and a second point is about to be entered, or the entry of a second point is completed and a third point is about to be entered. When a first point candidate is specified, display lines for use in expressing a first point candidate in a cursor coordinate system are computed at steps 630 and 640 and displayed at step 680. When a second or third point candidate is specified, it is computed at steps 650 and 670. Display lines for expressing the second or third point candidate in the local coordinate system are computed at step 660 and displayed at step 680.

The work for entering a solid has been described so far. Needless to say, a plurality of solids can also be arranged. For arranging a plurality of solids with a reference plane unchanged, the aforesaid step of setting a reference plane is excluded from the aforesaid procedure for entering a solid.

In this embodiment, three points entered are used as three vertices of a rectangular parallelepiped. The present invention is not limited to this technique but may use the technique described below.

Figure 12:
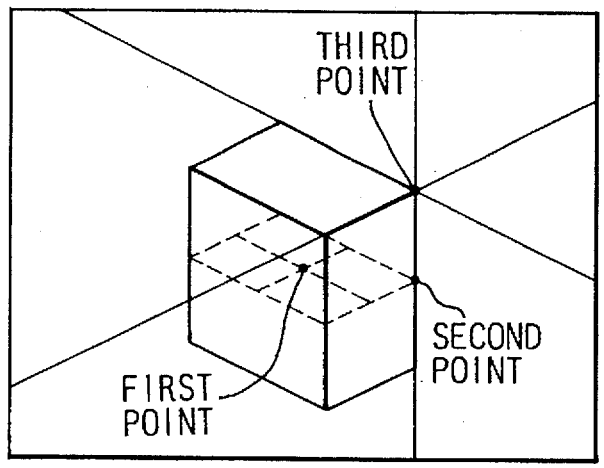
FIG. 12 shows another technique of defining a rectangular parallelepiped inscribing a solid.

A technique conceivable first is, as shown in FIG. 12, such that a first point is used as a center of a rectangular parallelepiped, a second point is used as a middle point of one side thereof, and a third point is used as a vertex thereof.

Figure 13:
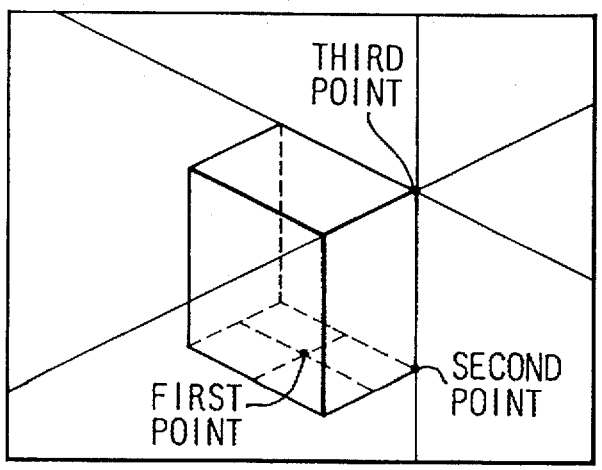
FIG. 13 shows another technique of defining a rectangular parallelepiped inscribing a solid.

Another technique is, as shown in FIG. 13, such that a first point is used as a center of a rectangular parallelepiped, a second point is used as a vertex of the base thereof, and a third point is used as a vertex of the base thereof opposed to the second point.

Figure 14B:
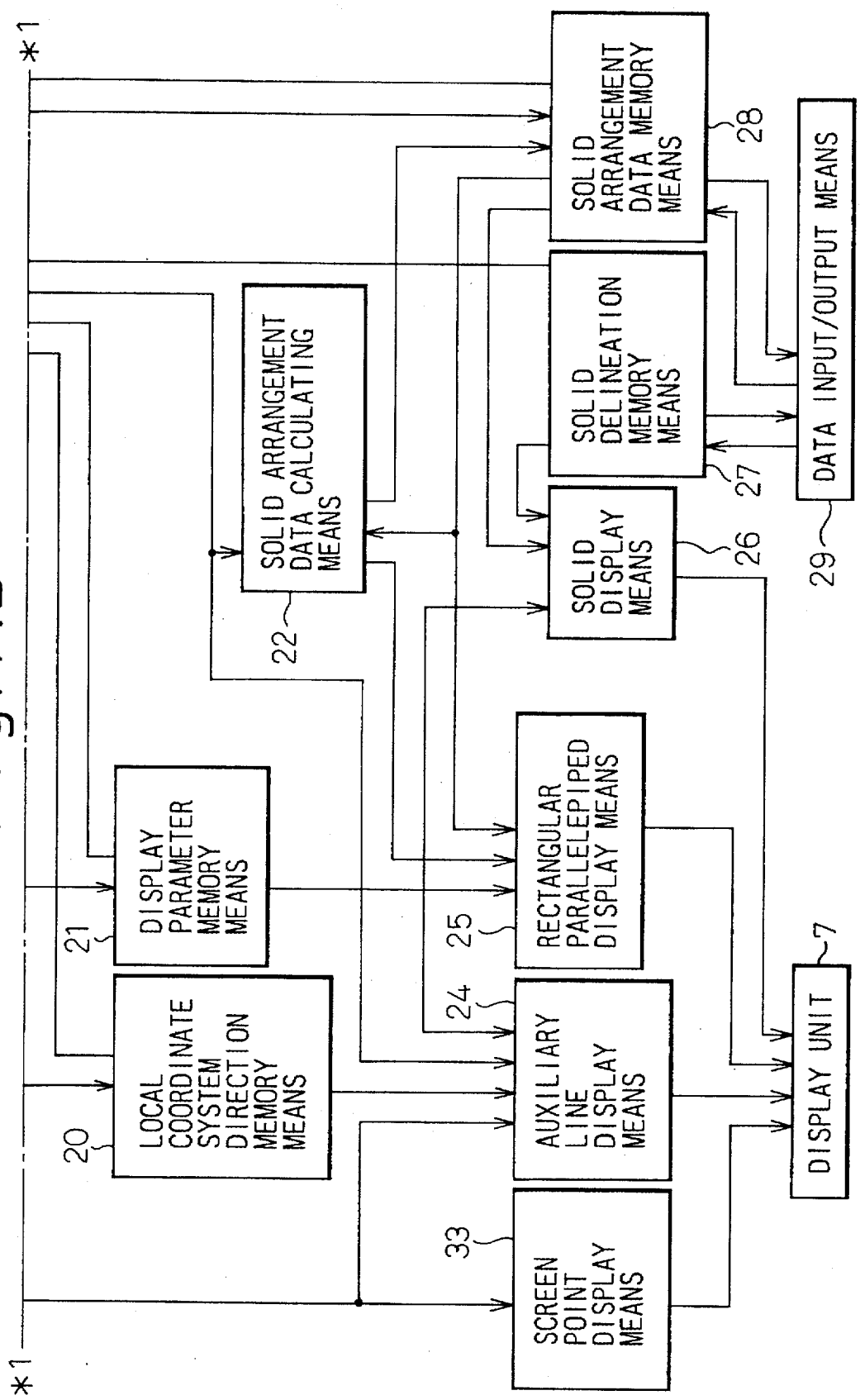

Next, the second embodiment will be described. A three-dimensional solid arranging/editing system of the second embodiment is embodied in the form of a computer graphic system shown in FIGS. 1 and 2. FIGS. 14A and 14B are block diagrams showing the facilities of the three-dimensional solid arranging/editing system.

As shown in FIGS. 14A and 14B, the three-dimensional solid arranging/editing system of this embodiment comprises an entry detecting means 11, a screen point position detecting means 12, a local coordinate system direction calculating means 14, a display parameter calculating means 15, a solid selecting means 31, a solid editing means 32, a local coordinate system direction memory means 20, a display parameter memory means 21, a solid arrangement data calculating means 22, a screen point display means 33, an auxiliary line display means 24, a rectangular parallelepiped contour display means 25, a solid display means 26, a solid delineation memory means 26, a solid arrangement data memory means 28, a display unit 7, and a data input/output means 29. Elements identical to those shown in FIG. 3 are assigned the same reference numerals.

Figure 15:
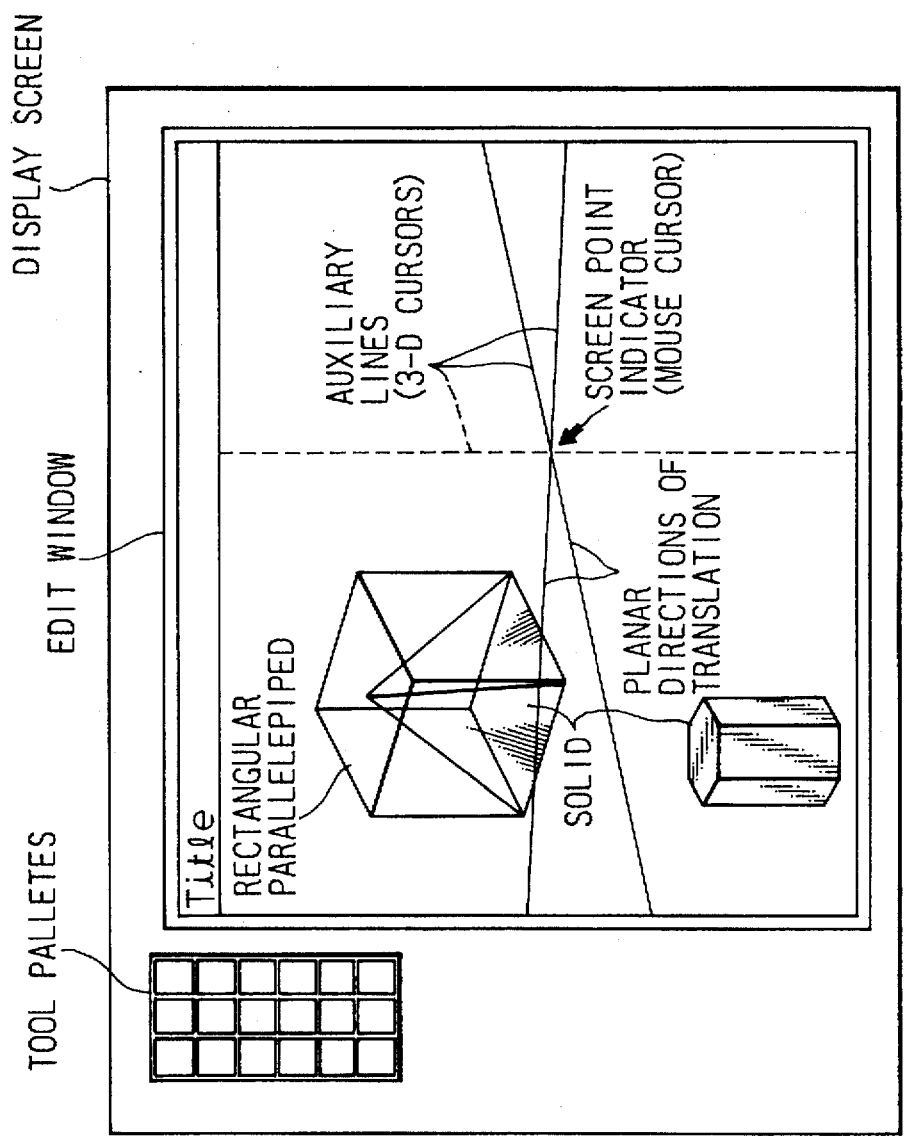
FIG. 15 shows a display screen in the second embodiment.

A screen display in this embodiment will be described. FIG. 15 shows an example of a display screen in this embodiment.

As shown in FIG. 15, in this embodiment, solids defined in a three-dimensional space, a screen point indicator (cursor interlocked with a mouse), auxiliary lines (three-dimensional cursors) that will be described later, and a tool palette are displayed in a screen on the display unit 7. The cursor is interlocked with the mouse. In this display screen, the solids expressed in the three-dimensional coordinate system that is a world coordinate system are displayed in a screen by transforming the data representing the solids into coordinate data concerning the two-dimensional screen through coordinate transformation. The transformation is restrained by display parameters. According to the present invention, the display parameters are predetermined using the display parameter calculating means 15 and stored in the display parameter memory means 21 in order to facilitate efficiency of entering and image displaying.

The display parameters include information representing a position of a point of sight in a three-dimensional space, a direction of scrutiny therein, an inclination (roll angle) therein, and an angle of a visual field. In practice, the position of a point of sight, direction of scrutiny, and inclination are defined as a whole in the form of a four-by-four matrix. The matrix is a coordinate transformation matrix for transforming a world coordinate system into a point-of-sight coordinate system (three-dimensional orthogonal coordinate system defined with an x axis in the horizontal direction of a screen, a y axis in the vertical direction thereof, and a z axis in a direction of scrutiny). The angle of a visual field is an angle of a visual field with respect to the lateral direction of a screen.

When a user modifies display parameters using an input unit or a screen point input unit, the display parameter calculating means 15 detects the fact via the entry detecting means 11 or screen point position detecting means 12. According to the contents of the modification, a program is run to calculate new values of the display parameters and thus set or modify the display parameters.

The tool palette is an area in which possible edit operations are displayed. Any of the edit operations can be selected using a cursor.

FIG. 16 shows a procedure for arranging or editing a solid in this embodiment.

As shown in FIG. 16, at step 610, a solid to be edited is selected using the cursor. At step 620, the contour of a circumscribed rectangular parallelepiped of the selected solid is displayed. At step 630, an edit operation to be performed on the selected solid is selected from the tool palette in FIG. 4. Steps 610 and 620 may be preceded by step 630. At step 640, part of the displayed rectangular parallelepiped is specified by the cursor. At step 650, the cursor specifying part of the rectangular parallelepiped at step 640 is dragged. At step 660, the solid concerned is duly edited according to the edit operation selected at step 630, part of the rectangular parallelepiped specified by the cursor, and the magnitude of dragging.

The steps in FIG. 16 will be described in detail.

To begin with, steps of selecting a solid and displaying a circumscribed rectangular parallelepiped of the solid will be described.

The solid arrangement data memory means 28 contains information representing whether individual solids are selected. For a solid selected, the rectangular parallelepiped contour display means 25 displays a frame of a circumscribed rectangular parallelepiped.

For selecting a solid to be edited, a cursor interlocked with a mouse is positioned at a solid to be edited and a button on the mouse is pressed. The screen point position detecting means 12 and entry detecting means 11 detects the pressing of the mouse. The solid selecting means 31 retrieves data from the solid arrangement data memory means 28 and solid delineation memory means 27, identifies an entered solid, and determines that the solid is selected. The rectangular parallelepiped contour display means 25 displays a circumscribed rectangular parallelepiped of the selected solid.

As described later, according to an entry made at a keyboard or the like, the solid selecting means 31 enters either single selection mode (a specified solid alone is selected) or toggle selection mode (the state of selection of a specified solid is reversed). When a mouse is moved with a button held down, a solid within a rectangle having dragging start and end points as vertices is regarded as specified at the same time. Each solid is processed as mentioned above.

The work of steps 640 to 660 in FIG. 16 differs depending on an edit operation selected at step 630. The work will be described for each edit operation to be selected at step 630.

Figure 17A:
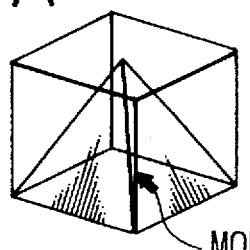
FIGS. 17A to 17C and FIGS. 18A to 18C are explanatory diagrams concerning rotating in the second embodiment.
Figure 17B:
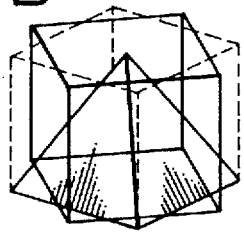
Figure 17C:
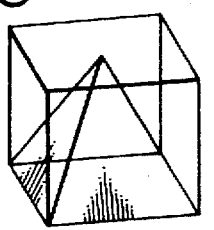
Figure 18A:
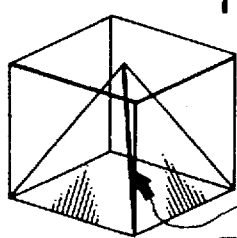
Figure 18B:
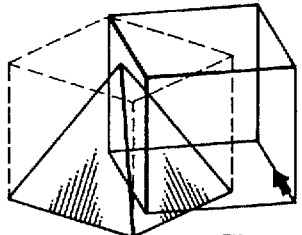
Figure 18C:
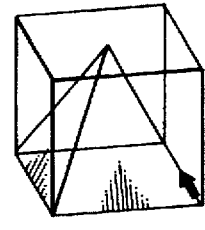

FIGS. 17A to 17C and 18A to 18C are explanatory diagrams concerning work to be carried out when rotating is selected as an edit operation. Rotating is classified into two kinds of work. For one kind of work, a center axis of a solid parallel to a specified side is used as a rotation axis. For the other kind of work, a side of a rectangular parallelepiped diagonal to a specified side is used as a rotation axis. FIGS. 17A to 17C show work to be carried out using a center axis of a solid as a rotation axis. FIGS. 18A to 18C show work to be carried out using a diagonal side as a rotation axis.

For rotating a solid, first, a rotating edit mode is selected at step 630 in FIG. 16. For selecting an edit mode, a cursor interlocked with a mouse is positioned at an icon in the tool palette and a button on the mouse is clicked. Clicking of the mouse is detected by the screen point position detecting means 12 and entry detecting means 11. The result of detection is received by the solid editing means 32. The rotating edit mode is then set up or a rotation axis calculating technique is selected. The tool palette contains icons associated with the above two kinds of rotating work. Either of the icons is selected.

For rotating a solid, first, a cursor interlocked with a mouse is positioned at a side of a frame of a circumscribed rectangular parallelepiped displayed. A button on the mouse is then pressed. The screen point position detecting means 12 and entry detecting means 11 detect the pressing of the mouse button. The solid editing means 32 having received the result of detection identifies the specified side on the basis of data retrieved from the arrangement data memory 28, and computes a rotation axis depending on whichever is selected from the two kinds of rotating work. For the edit operation in which a center axis of a solid is used as a rotation axis, as shown in FIG. 17A, a center axis of a solid parallel to the specified side is provided as a rotation axis. For the edit operation in which a diagonal side is used as a rotation axis, as shown in FIG. 18A, a side of a rectangular parallelepiped diagonal to the specified side is provided as a rotation axis.

The mouse is then moved with the button held down. The screen point position detecting means 12 detects the movement of the mouse. The solid editing means 32 having received the result of detection determines an angle of rotation on the basis of the magnitude of displacement of the mouse relative to the position at which the button on the mouse is pressed. The solid arrangement data calculating means 22 computes a frame of the circumscribed rectangular parallelepiped rotated by the angle of rotation. The rectangular parallelepiped contour display means 25 displays the frame. In FIG. 17B, the rectangular parallelepiped is rotated with the center axis of the solid parallel to the specified side as a rotation axis. In FIG. 18B, the rectangular parallelepiped is rotated with the side of the rectangular parallelepiped diagonal to the specified side as a rotation axis. When a plurality of solids are selected, circumscribed rectangular parallelepipeds of the solids are rotated about axes computed for the individual solids. When a parent solid in a hierarchical structure is selected, child and grandchild solids are rotated about the same axis as the parent solid is, so that the relationships with the parent solid can be retained.

After the mouse is moved, when the button is released, the solid editing means 32 finalizes the angle of rotation. The solid arrangement data calculating means 32 computes solid arrangement data concerning the finalized angle. Based on the solid arrangement data, the solid display means 26 displays the solid.

Figure 19A:
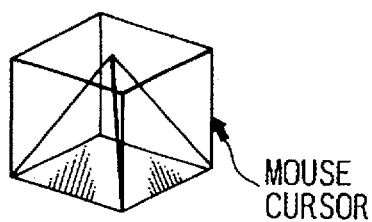
FIGS. 19A and 19C and FIGS. 20A to 20C are explanatory diagrams concerning enlarging or reducing in the second embodiment.
Figure 19B:
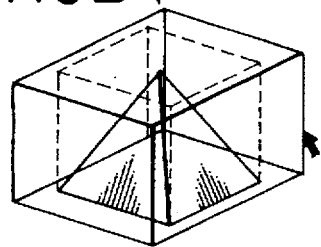
Figure 19C:
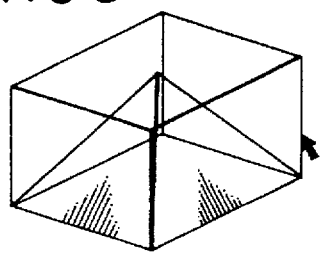
Figure 20A:
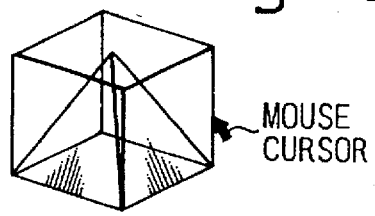
Figure 20B:
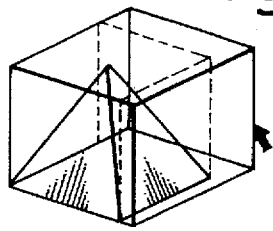
Figure 20C:
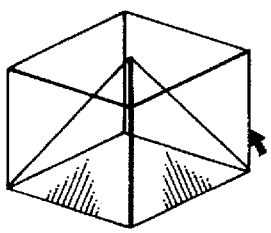

FIGS. 19A to 19C and 20A to 20C are explanatory diagrams concerning work to be carried out when enlarging or reducing of a solid is selected as an edit operation. Enlarging or reducing is classified into two kinds of work. For one kind of work, a center axis of a solid parallel to a specified side is used as a fixed axis. For the other kind of work, a side of a rectangular parallelepiped diagonal to a specified side is used as a fixed axis. FIGS. 19A to 19C show work to be carried out using a center axis of a solid as a fixed axis. FIGS. 20A to 20C show work to be carried out using a diagonal side as a fixed axis.

For enlarging or reducing a solid, first, an enlarging or reducing edit mode must be selected. For selecting an edit mode, a cursor interlocked with a mouse is positioned at an icon in the tool palette and a button on the mouse is pressed. The pressing of the mouse is detected by the screen point position detecting means 12 and entry detecting means 12. The result of detection is received by the solid editing means 32. Either of the two kinds of editing or reducing edit modes is set up or a fixed axis calculating technique is selected. The tool palette contains icons associated with the two kinds of rotating work. Either of the icons is selected.

For enlarging or reducing a solid, first, a cursor interlocked with a mouse is positioned at a side of a frame of a displayed circumscribed rectangular parallelepiped. A button on the mouse is then pressed. The screen point position detecting means 12 and entry detecting means 11 detect the pressing of the mouse. The solid editing means 32 having received the result of detection identifies the specified side on the basis of data retrieved from the solid arrangement data memory means 28, and computes a fixed axis. For the edit operation in which a center axis of a solid is used as a fixed axis, as shown in FIG. 19A, a center axis of a solid parallel to the specified side is provided as a fixed axis. For the edit operation in which a diagonal side is used as a fixed axis, as shown in FIG. 20A, a side of a rectangular parallelepiped diagonal to the specified side is provided as a fixed axis.

The mouse is then moved with the button held down. The screen point position detecting means 12 detects the movement of the mouse. The solid editing means 32 having received the result of detection determines magnifications in the directions of two axes orthogonal to the fixed axis on the basis of the magnitude of displacement of the mouse relative to the position at which the button on the mouse is pressed. The solid arrangement data calculating means 22 computes a frame of a circumscribed rectangular parallelepiped enlarged or reduced according to the magnifications. The rectangular parallelepiped contour display means 25 displays the rectangular parallelepiped. However, when a plurality of solids are selected, circumscribed rectangular parallelepipeds of the solids are enlarged or reduced with respect to fixed axes computed for the respective solids. In FIG. 19B, a rectangular parallelepiped is enlarged or reduced with respect to a fixed axis that is a center axis of a solid parallel to a specified side. In FIG. 20B, a rectangular parallelepiped is enlarged or reduced with respect to a fixed axis that is a side of the rectangular parallelepiped diagonal to the specified axis.

After the mouse is moved, and when the button is released, the solid editing means finalizes the magnitudes. The solid arrangement data calculating means 22 computes solid arrangement data according to the finalized magnitudes. Based on the solid arrangement data, the solid display means 26 displays the solid.

FIGS. 21A to 21C and 22A to 22C are explanatory diagrams showing work to be carried out when similar enlarging or reducing of a solid is selected as an edit operation. Similar enlarging or reducing is classified into two kinds of work. For one kind of work, a center of a solid specified is used as a fixed point. For the other kind of work, a point of a rectangular parallelepiped diagonal to a specified vertex is used as a fixed point. FIGS. 21A to 21C show work to be carried out when a center point of a solid is used as a fixed point. FIGS. 22A to 22C show work to be carried out when a diagonal point is used as a fixed point.

For similar enlarging or reducing of a solid, first, a cursor interlocked with a mouse is positioned at a vertex of a circumscribed rectangular parallelepiped displayed. A button on the mouse is then pressed. The screen point position detecting means 12 and entry detecting means 11 detects the pressing of the mouse. The solid editing means 32 having received the result of detection identifies the specified vertex on the basis of data retrieved from the solid arrangement data memory means 28 and computes a fixed point. For the edit operation in which a center of a solid is used as a fixed point, as shown in FIG. 21A, a center point of a specified solid is provided as a fixed point. For the edit operation in which a diagonal point is used as a fixed point, as shown in FIG. 22A, a point of a rectangular parallelepiped diagonal to a specified vertex is provided as a fixed axis.

The mouse is then moved with the button held down. The screen point position detecting means detects the movement of the mouse. The solid editing means 32 having received the result of detection determines a ratio of similitude on the basis of the magnitude of displacement of the mouse relative to the position at which the button on the mouse is pressed. The solid arrangement data calculating means 22 computes a frame of a circumscribed rectangular parallelepiped enlarged or reduced according to the ratio of similitude. The rectangular parallelepiped contour display means 25 displays the resultant frame. However, when a plurality of solids are selected, circumscribed rectangular parallelepipeds of the solids are enlarged or reduced with respect to fixed points computed for the respective solids. In FIG. 21B, a rectangular parallelepiped is enlarged or reduced with respect to a fixed point that is a center of a specified solid. In FIG. 22B, a rectangular parallelepiped is enlarged or reduced with respect to a fixed point that is a point of the rectangular parallelepiped diagonal to a specified vertex.

After the mouse is moved, when the button is released, the solid editing means 32 finalizes the ratio of similitude. The solid arrangement data calculating means 22 computes solid arrangement data according to the finalized ratio of similitude. Based on the data, the solid display means 26 displays the solid.

Figure 23A:
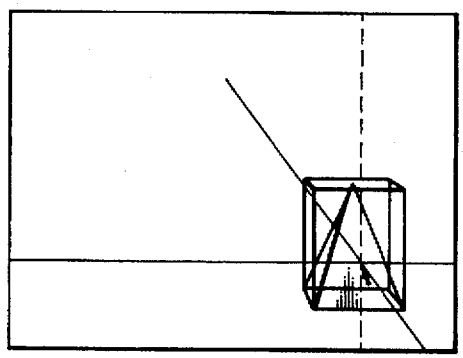
FIGS. 23A to 23C are explanatory diagrams concerning parallel translating in the second embodiment.
Figure 23B:
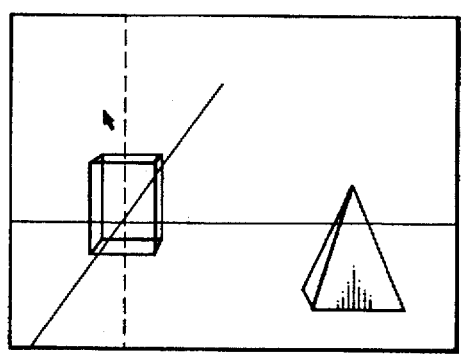
Figure 23C:
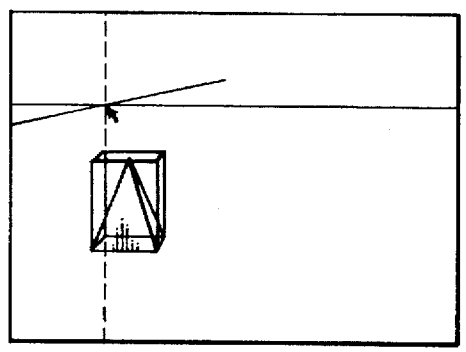

FIGS. 23A to 23C are explanatory diagrams showing work to be carried out when parallel translating of a solid is selected as an edit operation.

For translating a solid, first, a translating edit mode must be selected. For selecting the edit mode, a cursor interlocked with a mouse is positioned at an icon in the tool palette. A button on the mouse is then pressed. The pressing of the mouse button is detected by the screen point position detecting means 12 and entry detecting means 11. The result of detection is received by the solid editing means 32. The edit mode is then set up.

During translating of a solid, first, the cursor interlocked with the mouse is positioned at a side of a frame of a circumscribed rectangular parallelepiped displayed or at a solid displayed. The button on the mouse is then pressed. The screen point position detecting means 12 and entry detecting means 11 then detect the pressing of the mouse button. The solid editing means 32 having received the result of detection calculates a function, which derives a three-dimensional magnitude of translation of a solid from a magnitude of movement of the mouse, using the data representing planar directions of translation (directions on a plane in which a solid is translated with the movement of the mouse) stored in the local coordinate system direction memory means 20.

The mouse is then moved with the button held down. The screen point position detecting means 12 detects the movement of the mouse. The solid editing means having received the result of detection determines a magnitude of translation of a solid by assigning a magnitude of displacement of the mouse relative to the position, at which the button on the mouse is pressed, to the function mentioned above. The solid arrangement data calculating means 22 computes a frame of a circumscribed rectangular parallelepiped translated by the magnitude of translation determined. The rectangular parallelepiped contour display means 25 display the frame. When a plurality of solids are selected, circumscribed rectangular parallelepipeds of the solids are translated individually. When a parent solid in a hierarchical structure is selected, child and grandchild solids are also translated by the same magnitude of translation as is the parent solid.

After the mouse is moved, and when the button is released, the solid editing means 32 finalizes the magnitude of translation of a solid. The solid arrangement data calculating means 22 computes solid arrangement data representing an arrangement set after a solid is translated by the finalized magnitude, and updates the data in the solid arrangement data memory means 28. Based on the solid arrangement data, the solid display means 26 displays the solid.

Next, setting of data representing planar directions of translation in a local coordinate system will be described.

In preparation for delineating, directions of a local coordinate system, in which a solid to be entered is expressed, are designated and stored in the local coordinate system direction memory means 20. In this embodiment, the local coordinate system direction memory means 20 stores data representing planar directions of translation.

Directions of a local coordinate system are represented by vectors whose magnitudes and directions correspond to lengths and orientations of three axes (x, y, and z axes) of the local coordinate system in a world coordinate system. The vectors are defined in the form of a three-by-three matrix. Information representing a height definition axis is included.

Setting of data representing planar directions of translation in a local coordinate system is achieved by a procedure similar to the one for setting coordinate axes of a local coordinate system shown in FIGS. 7A and 7B, and 8A and 8B.

For matching planar directions of translation with a solid displayed in a screen, as shown in FIGS. 7A and 7B, a cursor interlocked with a mouse is positioned at the solid. Entering (clicking a button on the mouse) is then carried out. The local coordinate system direction calculating means 14 identifies the solid specified, and stores the directions of the local coordinate system in which the solid is expressed as new planar directions of translation.

For correcting the planar directions of translation stored in the local coordinate system direction memory means 20, as shown in FIGS. 8A and 8B, a frame of a cube having sides parallel to axes corresponding to the current planar directions of translation is displayed in a screen. The cursor is positioned at any of the sides of the frame, and dragged with the button on the mouse held down. While the mouse is being moved, the local coordinate system direction calculating means 14 determines an angle of rotation according to the direction and magnitude of movement of the mouse, rotates the cube around a straight line, which is parallel to the side specified by the cursor and passing through the center of the cube, as a rotation axis, and displays the resultant cube. When the button on the mouse is released, directions corresponding to axes parallel to the sides of the cube are determined as new planar directions of translation.

As mentioned above, for translating a solid, the solid should be specified directly. A circumscribed rectangular parallelepiped of the solid need not be displayed all the time.

As described so far, a three-dimensional solid editing system of this embodiment can edit a plurality of solids simultaneously. When a mouse is moved with a button thereon held down, a solid in a rectangle whose vertices are start and end points of the movement is thought to be specified at the same time. Each solid is processed as mentioned above.

What is claimed is:

1. A three-dimensional solid arranging/editing method, to be implemented in a graphic system in which a point can be specified in a screen by a cursor, comprising the steps of:

selecting a solid displayed on the screen with said cursor;

selecting a predetermined rule from a plurality of rules for producing a reference plane;

producing a reference plane according to said selected solid and said selected rule; and entering a position of a point, on said reference plane, as specified by said cursor which is supposed to move on said reference plane, as a three-dimensional position.

2. A three-dimensional solid arranging/editing method according to claim 1, wherein one of said rules for producing a reference plane provides a plane, which contains said point on said selected solid specified by said cursor and is parallel with the screen, as a reference plane.

3. A three-dimensional solid arranging/editing method according to claim 1, wherein said selected solid is expressed in a local coordinate system, and one of said rules for producing a reference plane provides a plane that is parallel with a coordinate plane of said local coordinate system and in contact with said selected solid, as a reference plane.

4. A three-dimensional solid arranging/editing method according to claim 1, wherein said selected solid is expressed in a local coordinate system, and one of said rules for producing a reference plane provides a plane that is parallel with a coordinate plane at said local coordinate system and contains a center of said selected solid, as a reference plane of said local coordinate system.

5. A three-dimensional solid arranging/editing method according to claim 1, wherein whether or not to display said defined reference plane can be selected freely.

6. A three-dimensional solid arranging/editing method according to claim 1, wherein said defined reference plane is displayed in the form of a dot array.

7. A three-dimensional solid arranging/editing method to be implemented in a graphic system in which a point can be specified in a screen by a cursor, comprising steps of:

entering a first point by specifying said first point using said cursor;

defining a plane containing said first point;

entering a second point on said plane;

entering a third point on a straight line being perpendicular to said plane and passing said second point; and arranging a solid, of which the delineation is predetermined, in a rectangular parallelepiped having said first, second, and third points as given points by adjusting the position of said solid and the scales in three axial directions thereof so that said solid will be inscribed in said rectangular parallelepiped.

8. A three-dimensional solid arranging/editing method according to claim 7, wherein said first, second, and third points are vertices of said rectangular parallelepiped.

9. A three-dimensional solid arranging/editing method according to claim 7, wherein said first point is a center point of said rectangular parallelepiped, said second point is a middle point of a side thereof, and said third point is a vertex thereof.

10. A three-dimensional solid arranging/editing method according to claim 7, wherein said first point is a center point of a base of said rectangular parallelepiped, said second point is a vertex of the base thereof, and said third point is a vertex of a plane opposed to said base thereof.

11. A three-dimensional solid arranging/editing method according to claim 7, wherein said step of entering a first point includes the steps of:

defining a reference plane in a three-dimensional space; and entering a point on said reference plane specified by said cursor, which is supposed to move on said reference plane, as a first point.

12. A three-dimensional solid arranging/editing method according to claim 11, wherein, at said step of defining a plane containing said first plane, a local coordinate system having said reference plane as one of coordinate planes is defined.

13. A three-dimensional solid arranging/editing method according to claim 12, wherein said step of defining a plane containing said second point includes the steps of:
   displaying a point on said coordinate plane specified by said cursor, which is supposed to move on said coordinate plane of said local coordinate system, as a second point candidate, and also displaying a rectangle that lies on said coordinate plane of said local coordinate system and that has said first point and second point candidate as given points; and
   entering said second point coordinate as a second point.

14. A three-dimensional solid arranging/editing method according to claim 13, wherein said step of defining a plane containing said third point includes the steps of:
   displaying auxiliary lines perpendicular to said coordinate plane of said local coordinate system and passing said second point, displaying a point on any of said auxiliary lines specified by said cursor as a third point candidate, and also displaying a rectangular parallelepiped that is expressed in said local coordinate system and that has said rectangle as a base or a section and said third point candidate as a vertex; and
   entering said third point candidate as a third point.

15. A three-dimensional solid arranging/editing method according to claim 12, wherein after said local coordinate system is determined, three straight lines that are parallel to the three coordinate axes defining said local coordinate system and that intersect at said point specified by said cursor are displayed.

16. A three-dimensional solid arranging/editing method according to claim 15, wherein one of said three straight lines that are parallel to three coordinate axes defining said local coordinate system and that intersect at said point specified by said cursor is recognized as a height definition axis and displayed in a different color from the other two straight lines.

17. A three-dimensional solid arranging/editing method according to claim 11, wherein, at said step of defining a plane containing said first plane, a solid which is already arranged is selected, and a local coordinate system whose coordinate planes are parallel with coordinate planes of the local coordinate system of said solid is selected.

18. A three-dimensional solid arranging/editing method according to claim 17, wherein, at said step of defining a local coordinate system, a solid already arranged in a space is selected and rotated using said cursor, and a local coordinate system, in which said rotated solid is expressed, is designated.

19. A three-dimensional solid arranging/editing method to be implemented in a graphic system in which a point can be specified in a screen by a cursor, comprising the steps of:
   determining a ratio among external dimensions in three coordinate axial directions of a solid of which delineation is predetermined and which is to be entered, and also determining a rectangular parallelepiped inscribing said solid;
   entering a first point by specifying it using said cursor;
   defining a plane containing said first point;
   entering a second point on said plane; and
   arranging said solid so that one surface of said rectangular parallelepiped inscribing said solid will coincide with said rectangle.

20. A three-dimensional solid arranging/editing method according to claim 19, wherein said first and second points are vertices of said rectangular parallelepiped.

21. A three-dimensional solid arranging/editing method according to claim 19, wherein said first point is a center point of the base of said rectangular parallelepiped, and said second point is a vertex of said base thereof.

22. A three-dimensional solid arranging/editing method according to claim 19, wherein said first point is a center point of said rectangular parallelepiped, and said second point is a vertex of a section of said rectangular parallelepiped passing said center point thereof.

23. A three-dimensional solid arranging/editing method according to claim 19, wherein said step of entering said first point includes the steps of:
   defining a reference plane in a three-dimensional space; and
   entering a point on said reference plane specified by said cursor, which is supposed to move on said reference plane, as a first point.

24. A three-dimensional solid arranging/editing method according to claim 23, wherein, at said step of defining a plane containing said first point, a local coordinate system having said reference plane as one of coordinate planes is defined.

25. A three-dimensional solid arranging/editing method according to claim 24, wherein, at said step of defining a plane containing said first plane, a solid which is a already arranged is selected, and a local coordinate system whose coordinate planes are parallel with coordinate planes of the local coordinate system of said solid is selected.

26. A three-dimensional solid arranging/editing method according to claim 25, wherein, at said step of defining a local coordinate system, a solid already arranged in a space is selected and rotated using said cursor, and a local coordinate system, in which said rotated solid is expressed, is designated.

27. A three-dimensional solid arranging/editing method according to claim 24, wherein said step of defining a plane containing said second point includes the steps of:
   displaying a point on said coordinate plane specified by said cursor, which is supposed to move on said coordinate plane of said local coordinate system, as a second point candidate, and also displaying a rectangle that lies on said coordinate plane of said local coordinate system and that has said first point and second point candidates as given points; and
   entering said second point candidate as a second point.

28. A three-dimensional solid arranging/editing method to be implemented in a graphic system, comprising the steps of:
   expressing a delineation of a solid to be entered in a delineation coordinate system;
   defining a local coordinate system in a three-dimensional space;
   transforming said delineation of said solid expressed in said delineation coordinate system into data conformable to said local coordinate system; and
   arranging said solid according to said resultant solid delineation data expressed in said local coordinate system.

29. A three-dimensional solid arranging/editing method according to claim 28, wherein at said step of defining a local coordinate system, a solid already arranged in a space is selected, and an local coordinate system, in which said selected solid is expressed, is designated.

30. A three-dimensional solid arranging/editing method according to claim 29, wherein, at said step of defining a local coordinate system, a solid already arranged in a space is selected and rotated using said cursor, and a local coordinate system, in which said rotated solid is expressed, is designated.

31. A three-dimensional solid arranging/editing method for graphics to be implemented in a graphic system in which a point is specified in a screen by a cursor, comprising steps of:

selecting a solid to be edited;

displaying a contour of a circumscribed rectangular parallelepiped of said selected solid;

selecting an edit operation;

specifying part of said rectangular parallelepiped;

activating and moving said cursor relative to said specified part of said rectangular parallelepiped; and editing said selected solid according to said selected edit operation, said specified part of said rectangular parallelepiped, and the movement of said activated cursor.

32. A three-dimensional solid arranging/editing method according to claim 31, wherein said edit operation includes rotating a solid.

33. A three-dimensional solid arranging/editing method according to claim 32, wherein said rotating includes rotating to be effected using a center axis of a solid parallel to a specified side of said rectangular parallelepiped as a rotation axis.

34. A three-dimensional solid arranging/editing method according to claim 32, wherein said rotating includes rotating to be effected using the opposite side of said rectangular parallelepiped relative to said specified side thereof as a rotation axis.

35. A three-dimensional solid arranging/editing method according to claim 31, wherein said edit operation includes enlarging or reducing a solid.

36. A three-dimensional solid arranging/editing method according to claim 35, wherein said enlarging or reducing includes work for translating said specified side of said rectangular parallelepiped by a magnitude of a movement of said activated cursor with respect to a fixed axis that is a center axis of said rectangular parallelepiped parallel to said specified side thereof, and translating the other three sides of said rectangular parallelepiped parallel to said specified side thereof while retaining the nature of a rectangular parallelepiped.

37. A three-dimensional solid arranging/editing method according to claim 35, wherein said enlarging or reducing includes work for translating said specified side of said rectangular parallelepiped by a magnitude of movement of said activated cursor with respect to a fixed axis that is the opposite side of said rectangular parallelepiped relative to said specified side thereof, and translating other two sides of said rectangular parallelepiped, which are parallel to said specified side thereof but include neither said specified side thereof nor said fixed axis, while retaining the nature of a rectangular parallelepiped.

38. A three-dimensional solid arranging/editing method according to claim 35, wherein said enlarging or reducing includes work for translating a specified vertex of said rectangular parallelepiped by a magnitude of a movement of said activated cursor with respect to a fixed point that is a center of said rectangular parallelepiped, and translating the other seven vertices thereof while retaining the nature of a rectangular parallelepiped.

39. A three-dimensional solid arranging/editing method according to claim 35, wherein said enlarging or reducing includes work for translating said specified vertex of said rectangular parallelepiped by a magnitude of a movement of said activated cursor with respect to a fixed point that is a vertex opposed to said vertex of said rectangular parallelepiped, and translating other six vertices thereof except said specified vertex thereof and said fixed point while retaining the nature of a rectangular parallelepiped.

40. A three-dimensional solid arranging/editing method according to claim 31, wherein said edit operation includes parallel translation, in predetermined planar directions, of a solid.

41. A three-dimensional solid arranging/editing method for graphics to be implemented in a graphic system, comprising the steps of:

defining planar directions of translation in which a solid to be edited is translated in parallel, and setting said planar directions of translation to desired directions;

activating and moving said cursor relative to specified part of said solid or a circumscribed rectangular parallelepiped; and translating said selected solid, in parallel, in any of said planar directions of translation according to a magnitude of movement of said activated cursor.

42. A three-dimensional solid arranging/editing method according to claim 41, wherein two orthogonal straight lines parallel with said planar directions of translation are displayed.

43. A three-dimensional solid arranging/editing method according to claim 41, wherein a straight line passing an intersection between two orthogonal straight lines, which are parallel with said planar directions of translation and define a plane, and being perpendicular to said plane is displayed.

44. A three-dimensional solid arranging/editing method according to claim 43, wherein said two orthogonal straight lines parallel with said planar directions of translation and defining said plane and said straight line perpendicular to said plane are displayed using different display techniques.

45. A three-dimensional solid arranging/editing method according to claim 43, wherein an intersection between said two orthogonal straight lines parallel with said planar directions of translation and defining said plane and said straight line perpendicular to said plane coincides with said point on a screen specified by said cursor.

46. A three-dimensional solid arranging/editing method according to claim 41, wherein a contour of a circumscribed rectangular parallelepiped of said selected solid to be edited is displayed.

47. A three-dimensional solid arranging/editing method according to claim 46, wherein said contour of said circumscribed rectangular parallelepiped of said selected solid to be edited is translated according to the movement of said activated cursor and is stopped when said cursor is inactivated, so that said solid will appear to be inscribed in said rectangular parallelepiped.

48. A three-dimensional solid arranging/editing system having a cursor display means that detects a position specified by a cursor and displays said cursor at a position in a screen corresponding to a detected position, comprising:

a reference plane position calculating means for computing a position of a reference plane according to a displayed solid and one of the rules for producing a reference plane and a point position calculating means for entering a position of a point on said reference plane specified by said cursor, which is supposed to move on said reference plane, as a three-dimensional position.

49. A three-dimensional solid arranging/editing system according to claim 48, further comprising a local coordinate system direction memory means for storing directions defining a local coordinate system in which a delineation of said solid is expressed, wherein:

said reference plane position calculating means computes a plane, which contains said position on said solid specified by said cursor and is parallel to the screen, as a reference plane for said local coordinate system.

50. A three-dimensional solid arranging/editing system according to claim 48, further comprising a local coordinate system direction memory means for storing directions defining a local coordinate system in which a delineation of said solid is expressed, wherein:

said reference plane position calculating means computes a plane, which is parallel with one of coordinate plane of said local coordinate system and in contact with said selected solid, as a reference plane of said local coordinate system.

51. A three-dimensional solid arranging/editing system according to claim 48, further comprising a local coordinate system direction memory means for storing directions defining a local coordinate system in which a delineation of said selected solid is expressed, wherein:

said reference plane position calculating means computes a plane, which is parallel with one of coordinate plane of said local coordinate system and contains a center of said selected solid, as a reference plane of said local coordinate system.

52. A three-dimensional solid arranging/editing system according to claim 48, further comprising a reference plane display means for displaying said reference plane, wherein said reference plane display means can select freely whether or not to display said reference plane.

53. A three-dimensional solid arranging/editing system according to claim 48, further comprising a reference plane display means for displaying said reference plane, wherein said reference plane display means displays said reference plane in the form of an array of dots.

54. A three-dimensional solid arranging/editing system having a cursor display means that detects a position specified by a cursor and displays said cursor at a position in a screen corresponding to a detected position, comprising:

a reference plane position calculating means for computing the position of a reference plane according to a displayed solid and a rule for producing a reference plane;

a first point position calculating means for entering a position of a point on said reference plane specified by said cursor, which is supposed to move on said reference plane, as a first three-dimensional position;

a second point position calculating means for computing a second point that is a point on a coordinate plane of a local coordinate system specified by said cursor, said cursor being supposed to move on said coordinate plane;

a rectangular parallelepiped contour display means for displaying a rectangle that has said first point and second point as given points and lies on said coordinate plane of said local coordinate system;

an auxiliary line display means for displaying auxiliary lines, passing said finalized second point, that are perpendicular to said coordinate plane of said local coordinate system; and a third point position calculating means for computing a third point that is a point located on an auxiliary line and specified by said cursor;

said rectangular parallelepiped contour display means displaying a rectangular parallelepiped that is expressed in said local coordinate system and that has said rectangle as one surface or section and a third point candidate, which is a point located on an auxiliary line and specified by said cursor, as a vertex;

said system further comprising a solid arrangement data calculating means for adjusting the position of a solid whose delineation is predetermined and the scales, in three coordinate axial directions, of said solid so that said solid will be inscribed in said rectangular parallelepiped.

55. A three-dimensional solid arranging/editing system according to claim 54, wherein said reference plane is defined as one of said coordinate planes of said local coordinate system.

56. A three-dimensional solid arranging/editing system according to claim 54, wherein a local coordinate system is defined so that one of coordinate planes of said local coordinate system is parallel with one of coordinate planes of a local coordinate system of a solid which is already arranged and selected.

57. A three-dimensional solid arranging/editing system according to claim 54, wherein said first, second, and third points are vertices of said rectangular parallelepiped.

58. A three-dimensional solid arranging/editing system according to claim 54, wherein said first point is a center point of said rectangular parallelepiped, said second point is a middle point of one side thereof, and said third point is a vertex thereof.

59. A three-dimensional solid arranging/editing system according to claim 54, wherein said first point is a center point of the base of said rectangular parallelepiped, said second point is a vertex of the base thereof, and said third point is a vertex of a plane opposed to the base thereof.

60. A three-dimensional solid arranging/editing system according to claim 59, wherein after said line display means displays three straight lines that are parallel to three coordinate axes defining said local coordinate system and that intersect at a point specified by said cursor.

61. A three-dimensional solid arranging/editing system according to claim 60, wherein one of said three straight lines that are parallel to three coordinate axes defining said local coordinate system and that intersect at a point specified by said cursor is recognized as a height definition axis and displayed with a different color from the other two lines.

62. A three-dimensional solid arranging/editing system having a cursor display means that detects a position specified by a cursor and displays said cursor at a position in a screen corresponding to a detected position, comprising:

a reference plane position calculating means for computing a position of a reference plane according to a displayed solid and a predetermined rules for producing a reference plane;

a first point position calculating means for entering a position of a point on said reference plane specified by said cursor, which is supposed to move on said reference plane, as a first three-dimensional position;

a second point position calculating means for computing the position of a point on a coordinate plane of a local coordinate system specified by said cursor, said cursor being supposed to move on said coordinate plane;

a rectangular parallelepiped contour display means for displaying a rectangle that has said first and second points as given points and lies on said coordinate plane of said local coordinate system; and a solid arrangement data calculating means for arranging a solid, of which the delineation is predetermined and a ratio among external dimensions in three coordinate axial directions of which is determined, so that one surface of a rectangular parallelepiped inscribing said solid will coincide with said rectangle.

63. A three-dimensional solid arranging/editing system according to claim 62, wherein said first and second points are vertices of said rectangular parallelepiped.

64. A three-dimensional solid arranging/editing system according to claim 62, wherein said first point is a center point of said rectangular parallelepiped, and said second point is a middle point of one side of a section thereof containing said center point.

65. A three-dimensional solid arranging/editing system according to claim 62, wherein said first point is a center point of the base of said rectangular parallelepiped, and said second point is a middle point of one side of a section thereof.

66. A three-dimensional solid arranging/editing system, comprising:

a point position detecting means for detecting a position of a point specified in a screen;

a solid selecting means for selecting a solid specified to be edited;

a rectangular parallelepiped contour display means for displaying a contour of a circumscribed rectangular parallelepiped of said selected solid; and a solid editing means for setting an edit mode, according to a specified edit operation, and editing said selected solid according to said selected edit operation, said specified part of said rectangular parallelepiped, and a movement detected by said point position detecting means.

67. A three-dimensional solid arranging/editing system according to claim 66, wherein said solid editing means copes with an edit mode for rotating a solid.

68. A three-dimensional solid arranging/editing system according to claim 67, wherein said solid editing means executes editing; that is, rotation to be effected around a center axis of a solid parallel to a specified side of said rectangular parallelepiped as a rotation axis.

69. A three-dimensional solid arranging/editing system according to claim 67, wherein said solid editing means executes editing; that is, rotation to be effected around an opposite side of said rectangular parallelepiped relative to said specified side thereof as a rotation axis.

70. A three-dimensional solid arranging/editing system according to claim 66, wherein said solid editing means copes with an edit mode for enlarging or reducing a solid.

71. A three-dimensional solid arranging/editing system according to claim 70, wherein said solid editing means executes such editing as to translate said specified side of said rectangular parallelepiped by a magnitude of movement of said activated cursor with respect to a fixed axis, that is a center axis, of said rectangular parallelepiped parallel to said specified side thereof, and to translate the other three sides of said rectangular parallelepiped parallel to said specified side thereof while retaining the nature of a rectangular parallelepiped.

72. A three-dimensional solid arranging/editing system according to claim 70, wherein said solid editing means executes such editing as to translate a specified side of said rectangular parallelepiped by said magnitude of movement of said activated cursor with respect to a fixed axis, that is an opposite side of said rectangular parallelepiped relative to said specified side thereof, and to translate the other two sides of said rectangular parallelepiped, which are parallel to said specified side thereof but include neither said specified side of said rectangular parallelepiped nor said fixed axis, while retaining the nature of a rectangular parallelpiped.

73. A three-dimensional solid arranging/editing system according to claim 70, wherein said solid editing means executes such editing as to translate a specified vertex of said rectangular parallelepiped by a magnitude of movement of said activated cursor with respect to a fixed point that is a center of said rectangular parallelepiped.

74. A three-dimensional solid arranging/editing system according to claim 70, wherein said solid editing means executes such editing as to translate said specified vertex of said rectangular parallelepiped by a magnitude of movement of said activated cursor with respect to a fixed point that is a vertex of said rectangular parallelepiped opposed to said specified vertex thereof and to translate the other six vertices thereof except said specified vertex thereof and said fixed point while retaining the nature of a rectangular parallelepiped.

75. A three-dimensional solid arranging/editing system according to claim 66, wherein said solid editing means copes with an edit mode for translating a solid in parallel in predetermined planar directions of translation.

76. A three-dimensional solid arranging/editing system, comprising:

a point position detecting means for detecting the position of a point specified in a screen;

a local coordinate system direction calculating means for setting a local coordinate system which defines planar directions of translation in which said solid is translated in parallel;

a solid selecting means for selecting a solid specified to be edited; and a solid editing means for translating said selected solid in any of said planar directions of translation according to the movement detected by said point position detecting means.

77. A three-dimensional solid arranging/editing system according to claim 76, further comprising an auxiliary line display means for displaying two orthogonal straight lines parallel with said planer directions of translation.

78. A three-dimensional solid arranging/editing system according to claim 76, wherein said auxiliary line display means displays a straight line that passes an intersection between two orthogonal straight lines which are parallel with said planar directions of translation.

79. A three-dimensional solid arranging/editing system according to claim 78, wherein said two orthogonal lines parallel with said planar directions of translation and defining said plane, and said straight line perpendicular to said plane, are displayed using different display techniques.

80. A three-dimensional solid arranging/editing system according to claim 78, wherein an intersection between said two orthogonal straight lines parallel with said planar directions of translation and defining said plane and said straight line perpendicular to said plane coincides with said point in a screen specified by said cursor.

81. A three-dimensional solid arranging/editing system according to claim 76, further comprising a rectangular parallelepiped contour display means for displaying the contour of a circumscribed rectangular parallelepiped of said selected solid to be edited.

* * * * *

UNITED STATES PATENT AND TRADEMARK OFFICE
CERTIFICATE OF CORRECTION

PATENT NO. : 5,712,965
DATED : Jan. 27, 1998
INVENTOR(S) : FUJITA et al.

It is certified that error appears in the above-identified patent and that said Letters Patent is hereby corrected as shown below:

TITLE PAGE:
    [75] Inventors, change "Inagi" to --Tokyo-- (all three occurrences);
    [57] Abstract, last line, change "parellelepiped" to --parallelepiped--.

Col. 28, line 35 (Claim 60, line 2), after "said" insert --local coordinate system is determined, said auxiliary--;
line 64 (Claim 62, line 19), after "and" insert --that--.

Signed and Sealed this

Ninth Day of June, 1998

Attest:

BRUCE LEHMAN

*Attesting Officer*      *Commissioner of Patents and Trademarks*